US012283158B2

(12) United States Patent
Nguyen

(10) Patent No.: US 12,283,158 B2
(45) Date of Patent: *Apr. 22, 2025

(54) ASYNCHRONOUS PERSISTENT GROUP BONUS GAME

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/855,078

(22) Filed: Jun. 30, 2022

(65) Prior Publication Data
US 2022/0327891 A1 Oct. 13, 2022

Related U.S. Application Data

(63) Continuation of application No. 15/674,480, filed on Aug. 10, 2017, now Pat. No. 11,393,287, which is a (Continued)

(51) Int. Cl.
G07F 17/32 (2006.01)
A63F 13/00 (2014.01)

(52) U.S. Cl.
CPC .......... *G07F 17/3244* (2013.01); *A63F 13/00* (2013.01); *G07F 17/32* (2013.01); *G07F 17/3211* (2013.01)

(58) Field of Classification Search
CPC .. G07F 17/3244; G07F 17/32; G07F 17/3211; G07F 17/3225; G07F 17/3227;
(Continued)

(56) References Cited

U.S. PATENT DOCUMENTS 2,033,638 A 3/1936 Koppl
2,062,923 A 12/1936 Pal
(Continued)

FOREIGN PATENT DOCUMENTS

GB 2033638 A 5/1980
GB 2062923 A 5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

Primary Examiner — Jasson H Yoo
(74) Attorney, Agent, or Firm — Weaver Austin Villeneuve & Sampson LLP

(57) ABSTRACT

An asynchronous persistent group bonus game system, method and apparatus may have a plurality of gaming machines including a first processor and a bonus server having a second processor. The first processor may be configured to: determine when a bonus game session event is triggered, transmit a bonus game session request to the second processor, and receive an end session notification from the second processor. The second processor may be configured to execute and maintain the always-on asynchronous persistent group bonus game, receive a bonus game session request from at least one of the plurality of gaming machines, instantiate a bonus game session inside the continuous asynchronous persistent group bonus game for the at least one gaming machine, determine when an end session trigger has been triggered for the bonus game session, and transmit an end session notification to the at least one gaming machine if it is determined that the end session condition has been triggered.

20 Claims, 13 Drawing Sheets

Related U.S. Application Data continuation of application No. 13/801,121, filed on Mar. 13, 2013, now Pat. No. 9,741,205, which is a continuation of application No. 12/619,672, filed on Nov. 16, 2009, now Pat. No. 8,597,108.

(58) Field of Classification Search
CPC ............... G07F 17/326; G07F 17/3267; G07F 17/3272; G07F 17/3281; A63F 13/00
See application file for complete search history.

(56) References Cited

U.S. PATENT DOCUMENTS

| | | |
|---|---|---|
| 4,741,539 A | 5/1988 | Sutton |
| 4,948,138 A | 8/1990 | Pease |
| 4,969,183 A | 11/1990 | Reese |
| 5,067,712 A | 11/1991 | Georgilas |
| 5,275,400 A | 1/1994 | Weingardt |
| 5,429,361 A | 7/1995 | Raven |
| 5,489,103 A | 2/1996 | Okamoto |
| 5,618,232 A | 4/1997 | Martin |
| 5,630,757 A | 5/1997 | Gagin |
| 5,655,961 A | 8/1997 | Acres |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell |
| 5,947,820 A | 9/1999 | Morro |
| 5,996,997 A | 12/1999 | Kamille |
| 5,997,401 A | 12/1999 | Crawford |
| 6,001,016 A | 12/1999 | Walker |
| 6,039,648 A | 3/2000 | Guinn |
| 6,059,289 A | 5/2000 | Vancura |
| 6,089,977 A | 7/2000 | Bennett |
| 6,095,920 A | 8/2000 | Sadahiro |
| 6,110,041 A | 8/2000 | Walker |
| 6,142,872 A | 11/2000 | Walker |
| 6,146,271 A | 11/2000 | Kadlic |
| 6,146,273 A | 11/2000 | Olsen |
| 6,165,071 A | 12/2000 | Weiss |
| 6,231,445 B1 | 5/2001 | Acres |
| 6,244,958 B1 | 6/2001 | Acres |
| 6,270,412 B1 | 8/2001 | Crawford |
| 6,290,600 B1 | 9/2001 | Glasson |
| 6,293,866 B1 | 9/2001 | Walker |
| 6,353,390 B1 | 3/2002 | Beri |
| 6,364,768 B1 | 4/2002 | Acres |
| 6,404,884 B1 | 6/2002 | Marwell |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham |
| 6,500,067 B1 | 12/2002 | Luciano |
| 6,505,095 B1 | 1/2003 | Kolls |
| 6,508,710 B1 | 1/2003 | Paravia |
| 6,561,900 B1 | 5/2003 | Baerlocher |
| 6,592,457 B1 | 7/2003 | Frohm |
| 6,612,574 B1 | 9/2003 | Cole |
| 6,620,046 B2 | 9/2003 | Rowe |
| 6,641,477 B1 | 11/2003 | Dietz, II |
| 6,645,078 B1 | 11/2003 | Mattice |
| 6,675,152 B1 | 1/2004 | Prasad |
| 6,699,128 B1 | 3/2004 | Beadell |
| 6,719,630 B1 | 4/2004 | Seelig |
| 6,749,510 B2 | 6/2004 | Giobbi |
| 6,758,757 B2 | 7/2004 | Luciano, Jr. |
| 6,773,345 B2 | 8/2004 | Walker |
| 6,778,820 B2 | 8/2004 | Tendler |
| 6,780,111 B2 | 8/2004 | Cannon |
| 6,799,032 B2 | 9/2004 | McDonnell |
| 6,800,027 B2 | 10/2004 | Giobbi |
| 6,804,763 B1 | 10/2004 | Stockdale |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker |
| 6,852,029 B2 | 2/2005 | Baltz |
| 6,869,361 B2 | 3/2005 | Sharpless |
| 6,875,106 B2 | 4/2005 | Weiss |
| 6,884,170 B2 | 4/2005 | Rowe |
| 6,884,172 B1 | 4/2005 | Lloyd |
| 6,902,484 B2 | 6/2005 | Idaka |
| 6,908,390 B2 | 6/2005 | Nguyen |
| 6,913,532 B2 | 7/2005 | Baerlocher |
| 6,923,721 B2 | 8/2005 | Luciano |
| 6,935,958 B2 | 8/2005 | Nelson |
| 6,949,022 B1 | 9/2005 | Showers |
| 6,955,600 B2 | 10/2005 | Glavich |
| 6,971,956 B2 | 12/2005 | Rowe |
| 6,984,174 B2 | 1/2006 | Cannon |
| 6,997,803 B2 | 2/2006 | Lemay |
| 7,018,292 B2 | 3/2006 | Tracy |
| 7,032,115 B2 | 4/2006 | Kashani |
| 7,033,276 B2 | 4/2006 | Walker |
| 7,035,626 B1 | 4/2006 | Luciano, Jr. |
| 7,037,195 B2 | 5/2006 | Schneider |
| 7,048,628 B2 | 5/2006 | Schneider |
| 7,048,630 B2 | 5/2006 | Berg |
| 7,063,617 B2 | 6/2006 | Brosnan |
| 7,076,329 B1 | 7/2006 | Kolls |
| 7,089,264 B1 | 8/2006 | Guido |
| 7,094,148 B2 | 8/2006 | Baerlocher |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer |
| 7,169,052 B2 | 1/2007 | Beaulieu |
| 7,175,523 B2 | 2/2007 | Gilmore |
| 7,181,228 B2 | 2/2007 | Boesch |
| 7,182,690 B2 | 2/2007 | Giobbi |
| 7,198,571 B2 | 4/2007 | Lemay |
| RE39,644 E | 5/2007 | Alcorn |
| 7,217,191 B2 | 5/2007 | Cordell |
| 7,243,104 B2 | 7/2007 | Bill |
| 7,247,098 B1 | 7/2007 | Bradford |
| 7,259,718 B2 | 8/2007 | Patterson |
| 7,275,989 B2 | 10/2007 | Moody |
| 7,285,047 B2 | 10/2007 | Gelb |
| 7,311,608 B1 | 12/2007 | Danieli |
| 7,314,408 B2 | 1/2008 | Cannon |
| 7,316,615 B2 | 1/2008 | Soltys |
| 7,316,619 B2 | 1/2008 | Nelson |
| 7,318,775 B2 | 1/2008 | Brosnan |
| 7,326,116 B2 | 2/2008 | John |
| 7,330,108 B2 | 2/2008 | Thomas |
| 7,346,358 B2 | 3/2008 | Wood |
| 7,355,112 B2 | 4/2008 | Laakso |
| 7,384,338 B2 | 6/2008 | Rothschild |
| 7,387,571 B2 | 6/2008 | Walker |
| 7,393,278 B2 | 7/2008 | Gerson |
| 7,396,990 B2 | 7/2008 | Lu |
| 7,415,426 B2 | 8/2008 | Williams |
| 7,425,177 B2 | 9/2008 | Rodgers |
| 7,427,234 B2 | 9/2008 | Soltys |
| 7,427,236 B2 | 9/2008 | Kaminkow |
| 7,427,708 B2 | 9/2008 | Ohmura |
| 7,431,650 B2 | 10/2008 | Kessman |
| 7,448,949 B2 | 11/2008 | Kaminkow |
| 7,500,913 B2 | 3/2009 | Baerlocher |
| 7,510,474 B2 | 3/2009 | Carter, Sr. |
| 7,513,828 B2 | 4/2009 | Nguyen |
| 7,519,838 B1 | 4/2009 | Suurballe |
| 7,559,838 B2 | 7/2009 | Walker |
| 7,563,167 B2 | 7/2009 | Walker |
| 7,572,183 B2 | 8/2009 | Olivas |
| 7,585,222 B2 | 9/2009 | Muir |
| 7,602,298 B2 | 10/2009 | Thomas |
| 7,607,174 B1 | 10/2009 | Kashchenko |
| 7,611,409 B2 | 11/2009 | Muir |
| 7,637,810 B2 | 12/2009 | Amaitis |
| 7,644,861 B2 | 1/2010 | Alderucci |
| 7,653,757 B1 | 1/2010 | Fernald |
| 7,693,306 B2 | 4/2010 | Huber |

(56) References Cited

U.S. PATENT DOCUMENTS

| | | |
|---|---|---|
| 7,699,703 B2 | 4/2010 | Muir |
| 7,722,453 B2 | 5/2010 | Lark |
| 7,742,996 B1 | 6/2010 | Kwan |
| 7,758,423 B2 | 7/2010 | Foster |
| 7,771,271 B2 | 8/2010 | Walker |
| 7,780,529 B2 | 8/2010 | Rowe |
| 7,780,531 B2 | 8/2010 | Englman |
| 7,785,192 B2 | 8/2010 | Canterbury |
| 7,811,172 B2 | 10/2010 | Asher |
| 7,819,749 B1 | 10/2010 | Fish |
| 7,822,688 B2 | 10/2010 | Labrou |
| 7,828,652 B2 | 11/2010 | Nguyen |
| 7,828,654 B2 | 11/2010 | Carter, Sr. |
| 7,828,661 B1 | 11/2010 | Fish |
| 7,850,528 B2 | 12/2010 | Wells |
| 7,874,919 B2 | 1/2011 | Paulsen |
| 7,877,798 B2 | 1/2011 | Saunders |
| 7,883,413 B2 | 2/2011 | Paulsen |
| 7,892,097 B2 | 2/2011 | Muir |
| 7,909,692 B2 | 3/2011 | Nguyen |
| 7,909,699 B2 | 3/2011 | Parrott |
| 7,918,728 B2 | 4/2011 | Nguyen |
| 7,927,211 B2 | 4/2011 | Rowe |
| 7,927,212 B2 | 4/2011 | Hedrick |
| 7,951,008 B2 | 5/2011 | Wolf |
| 8,057,298 B2 | 11/2011 | Nguyen |
| 8,057,303 B2 | 11/2011 | Rasmussen |
| 8,087,988 B2 | 1/2012 | Nguyen |
| 8,117,608 B1 | 2/2012 | Slettehaugh |
| 8,133,113 B2 | 3/2012 | Nguyen |
| 8,182,326 B2 | 5/2012 | Speer, II |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen |
| 8,231,456 B2 | 7/2012 | Zielinski |
| 8,235,803 B2 | 8/2012 | Loose |
| 8,276,010 B2 | 9/2012 | Vavilala |
| 8,282,475 B2 | 10/2012 | Nguyen |
| 8,323,099 B2 | 12/2012 | Durham |
| 8,337,290 B2 | 12/2012 | Nguyen |
| 8,342,946 B2 | 1/2013 | Amaitis |
| 8,393,948 B2 | 3/2013 | Allen |
| 8,403,758 B2 | 3/2013 | Hornik |
| 8,430,745 B2 | 4/2013 | Agarwal |
| 8,461,958 B2 | 6/2013 | Saenz |
| 8,465,368 B2 | 6/2013 | Hardy |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson |
| 8,678,901 B1 | 3/2014 | Kelly |
| 8,696,470 B2 | 4/2014 | Nguyen |
| 8,745,417 B2 | 6/2014 | Huang |
| 8,821,255 B1 | 9/2014 | Friedman |
| 8,834,254 B2 | 9/2014 | Buchholz |
| 8,858,323 B2 | 10/2014 | Nguyen |
| 8,864,586 B2 | 10/2014 | Nguyen |
| 8,942,995 B1 | 1/2015 | Kerr |
| 9,039,507 B2 | 5/2015 | Allen |
| 9,235,952 B2 | 1/2016 | Nguyen |
| 9,292,996 B2 | 3/2016 | Davis |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson |
| 9,576,425 B2 | 2/2017 | Nguyen |
| 9,626,826 B2 | 4/2017 | Nguyen |
| 9,666,015 B2 | 5/2017 | Acres |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi |
| 10,068,429 B2 | 9/2018 | Gagner |
| 10,115,270 B2 | 10/2018 | Gagner |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 10,818,133 B2 | 10/2020 | Nguyen |
| 11,393,287 B2 * | 7/2022 | Nguyen ................. A63F 13/00 |
| 2001/0004607 A1 | 6/2001 | Olsen |
| 2001/0016516 A1 | 8/2001 | Takatsuka |
| 2001/0024971 A1 * | 9/2001 | Brossard ............. G07F 17/3267 |
| | | 463/30 |
| 2001/0047291 A1 | 11/2001 | Garahi |
| 2002/0042295 A1 | 4/2002 | Walker |
| 2002/0111210 A1 | 8/2002 | Luciano |
| 2002/0111213 A1 | 8/2002 | Mcentee |
| 2002/0113369 A1 | 8/2002 | Weingardt |
| 2002/0116615 A1 | 8/2002 | Nguyen |
| 2002/0133418 A1 | 9/2002 | Hammond |
| 2002/0137217 A1 | 9/2002 | Rowe |
| 2002/0142825 A1 | 10/2002 | Lark |
| 2002/0147047 A1 | 10/2002 | Letovsky |
| 2002/0147049 A1 | 10/2002 | Carter |
| 2002/0151366 A1 | 10/2002 | Walker |
| 2002/0167536 A1 | 11/2002 | Valdes |
| 2003/0001338 A1 | 1/2003 | Bennett |
| 2003/0008696 A1 | 1/2003 | Abecassis |
| 2003/0027635 A1 | 2/2003 | Walker |
| 2003/0104860 A1 * | 6/2003 | Cannon ............... G07F 17/3244 |
| | | 463/25 |
| 2003/0224852 A1 | 12/2003 | Walker |
| 2004/0002386 A1 | 1/2004 | Wolfe |
| 2004/0023709 A1 | 2/2004 | Beaulieu |
| 2004/0023716 A1 | 2/2004 | Gauselmann |
| 2004/0048650 A1 | 3/2004 | Mierau |
| 2004/0068460 A1 | 4/2004 | Feeley |
| 2004/0082385 A1 | 4/2004 | Silva |
| 2004/0127277 A1 | 7/2004 | Walker |
| 2005/0003890 A1 | 1/2005 | Hedrick |
| 2005/0004980 A1 | 1/2005 | Vadjinia |
| 2005/0181875 A1 | 8/2005 | Hoehne |
| 2005/0239546 A1 | 10/2005 | Hedrick |
| 2006/0009283 A1 | 1/2006 | Englman |
| 2006/0036874 A1 | 2/2006 | Cockerille |
| 2006/0046822 A1 | 3/2006 | Kaminkow |
| 2006/0046830 A1 | 3/2006 | Webb |
| 2006/0046849 A1 | 3/2006 | Kovacs |
| 2006/0068893 A1 | 3/2006 | Jaffe |
| 2006/0073869 A1 | 4/2006 | Lemay |
| 2006/0073897 A1 | 4/2006 | Englman |
| 2007/0004510 A1 | 1/2007 | Underdahl |
| 2007/0026942 A1 | 2/2007 | Kinsley |
| 2007/0060254 A1 | 3/2007 | Muir |
| 2007/0060358 A1 | 3/2007 | Amaitis |
| 2007/0077981 A1 | 4/2007 | Hungate |
| 2007/0087833 A1 | 4/2007 | Feeney |
| 2007/0087834 A1 | 4/2007 | Moser |
| 2007/0093299 A1 | 4/2007 | Bergeron |
| 2007/0238505 A1 | 10/2007 | Okada |
| 2008/0013906 A1 | 1/2008 | Matsuo |
| 2008/0015032 A1 | 1/2008 | Bradford |
| 2008/0020824 A1 | 1/2008 | Cuddy |
| 2008/0032787 A1 | 2/2008 | Low |
| 2008/0070652 A1 | 3/2008 | Nguyen |
| 2008/0070681 A1 | 3/2008 | Marks |
| 2008/0076506 A1 | 3/2008 | Nguyen |
| 2008/0076548 A1 | 3/2008 | Paulsen |
| 2008/0076572 A1 | 3/2008 | Nguyen |
| 2008/0096650 A1 | 4/2008 | Baerlocher |
| 2008/0215319 A1 | 9/2008 | Lu |
| 2008/0248849 A1 | 10/2008 | Lutnick |

(56) References Cited

U.S. PATENT DOCUMENTS

| | | |
|---|---|---|
| 2009/0005165 A1 | 1/2009 | Arezina |
| 2009/0029766 A1 | 1/2009 | Lutnick |
| 2009/0054149 A1 | 2/2009 | Brosnan |
| 2009/0088258 A1 | 4/2009 | Saunders |
| 2009/0098925 A1 | 4/2009 | Gagner |
| 2009/0104977 A1 | 4/2009 | Zielinski |
| 2009/0104983 A1 | 4/2009 | Okada |
| 2009/0118002 A1 | 5/2009 | Lyons |
| 2009/0271287 A1 | 10/2009 | Halpern |
| 2009/0282469 A1 | 11/2009 | Lynch |
| 2010/0004058 A1 | 1/2010 | Acres |
| 2010/0056248 A1 | 3/2010 | Acres |
| 2010/0062833 A1 | 3/2010 | Mattice |
| 2010/0099499 A1 | 4/2010 | Amaitis |
| 2010/0227671 A1 | 9/2010 | Laaroussi |
| 2011/0039615 A1 | 2/2011 | Acres |
| 2011/0065492 A1 | 3/2011 | Acres |
| 2011/0183732 A1 | 7/2011 | Block |
| 2011/0183749 A1 | 7/2011 | Allen |
| 2011/0207525 A1 | 8/2011 | Allen |
| 2011/0212767 A1 | 9/2011 | Barclay |
| 2012/0015709 A1 | 1/2012 | Bennett |
| 2012/0046110 A1 | 2/2012 | Amaitis |
| 2012/0094769 A1 | 4/2012 | Nguyen |
| 2012/0100908 A1 | 4/2012 | Wells |
| 2012/0231885 A1 | 9/2012 | Speer, II |
| 2013/0005433 A1 | 1/2013 | Holch |
| 2013/0005443 A1 | 1/2013 | Kosta |
| 2013/0005453 A1 | 1/2013 | Nguyen |
| 2013/0059650 A1 | 3/2013 | Sylla |
| 2013/0065668 A1 | 3/2013 | Lemay |
| 2013/0196756 A1 | 8/2013 | Nguyen |
| 2013/0225279 A1 | 8/2013 | Patceg |
| 2013/0252730 A1 | 9/2013 | Joshi |
| 2013/0281188 A1 | 10/2013 | Guinn |
| 2013/0316808 A1 | 11/2013 | Nelson |
| 2017/0016819 A1 | 1/2017 | Barwicz |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |

FOREIGN PATENT DOCUMENTS

| | | |
|---|---|---|
| GB | 2096376 A | 10/1982 |
| GB | 2097570 A | 11/1982 |
| GB | 2335524 A | 9/1999 |
| JP | 12005000454 | 5/2007 |
| WO | 2005073933 | 8/2005 |
| WO | 2008027621 | 3/2008 |
| WO | 2009026309 | 2/2009 |
| WO | 2009062148 | 5/2009 |
| WO | 2010017252 | 2/2010 |

OTHER PUBLICATIONS

Finnegan, Amanda, "Casinos Connecting with Customers via iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/800,917, filed Mar. 13, 2013.
U.S. Appl. No. 13/961,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116 filed Mar. 15, 2013.
U.S. Appl. No. 13/801,271, filed Mar. 13, 2013.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581, 115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717, dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Final Office Action for U.S. Appl. No. 12/797,616 dated Oct. 13, 2012.
Office Action for U.S. Appl. No. 12/797,616 dated Mar. 15, 2012.
Final Office Action for U.S. Appl. No. 12/797,616 dated May 8, 2013.
Brochure, 5000 Ft. Inc., 1 page, Nov. 2010.
Office Action for U.S. Appl. No. 16/351,416, dated Feb. 23, 2021.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.

(56) References Cited

OTHER PUBLICATIONS

Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Notice of Allowance for U.S. Appl. No. 15/293,751, dated Aug. 4, 2017.
Advisory Action for U.S. Appl. No. 14/189,948, dated Jul. 28, 2017.
Final Office Action for U.S. Appl. No. 13/801,256, dated Aug. 15, 2014.
Final Office Action for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
U.S. Appl. No. 13/622,702, filed Sep. 19, 2012.
Office Action for U.S. Appl. No. 13/801,271, dated Oct. 31, 2014.
Office Action for U.S. Appl. No. 13/833,116, dated Mar. 27, 2015.
Office Action for U.S. Appl. No. 13/843,192, dated Jun. 19, 2015.
Advisory Action for U.S. Appl. No. 13/632,828, mailed Feb. 25, 2016.
Office Action for U.S. Appl. No. 13/622,702, dated Mar. 22, 2016.
Office Action for U.S. Appl. No. 13/801,171, dated Jun. 6, 2016.
Restriction Requirement for U.S. Appl. No. 13/296,182, dated Oct. 12, 2012.
Advisory Action for U.S. Appl. No. 13/843,192, dated May 8, 2014.
Notice of Allowance for U.S. Appl. No. 13/843,192, mailed Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Non-Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Office Action (Notice of Allowance and Fees Due (PTOL-85)) dated Mar. 10, 2022 for U.S. Appl. No. 15/674,480 (pp. 1-7).
Office Action (Notice of Allowance and Fees Due (PTOL-85)) dated Mar. 23, 2022 for U.S. Appl. No. 15/674,480 (pp. 1-4).
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.

(56) References Cited

OTHER PUBLICATIONS

Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/843,192, dated Jun. 9, 2016.
Final Office Action for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Office Action for U.S. Appl. No. 16/190,050, dated Jun. 1, 2020.
Notice of Allowance for U.S. Appl. No. 15/480,295, dated Jun. 15, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
"Professional Casino Slot Machine", Posted at www.vbtutor.net/VB.Sample/vbslot2.htm on Oct. 20, 2009.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.
Final Office Action for U.S. Appl. No. 16/794,212, dated Feb. 17, 2021.

* cited by examiner

| Team | Score | | Player | Team | Score | |
|---|---|---|---|---|---|---|
| UoIP | 150 | | B | UoIP | 5 | } 802 |
| Int. Garden | 120 | | C | Int. Garden | 20 | |

Bonus Assets

Boat:
Row boat

Lure:
Worm          } 804

Rod:
Basic

Name
D

Team
Int. Garden      } 806

Avatar

Score
0

ASYNCHRONOUS PERSISTENT GROUP BONUS GAME

RELATED APPLICATIONS

This application is continuation of U.S. patent application Ser. No. 15/674,480, filed Aug. 10, 2017, and entitled "Asynchronous Persistent Group Bonus Game," which is continuation of U.S. patent application Ser. No. 13/801,121, filed Mar. 13, 2013, which issued on Aug. 22, 2017 as U.S. Pat. No. 9,741,205, and entitled "Asynchronous Persistent Group Bonus Game," which is continuation of U.S. patent application Ser. No. 12/619,672, filed Nov. 16, 2009, which issued on Dec. 3, 2013 as U.S. Pat. No. 8,597,108 and entitled "Asynchronous Persistent Group Bonus Game," all of which are hereby incorporated by reference herein in their entireties.

FIELD

The present disclosure relates generally to the field of gaming systems, and more particularly to asynchronous persistent group bonus gaming systems.

BACKGROUND

Gaming machines generally require the player to place or make a wager to activate the primary game of chance. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards and/or allow the player to play a bonus game.

The bonus games usually provide an additional award to the player. The bonus games usually do not require an additional wager by the player to be activated and may generally be activated by a triggering symbol or combination played in the primary game of chance. When a bonus game is triggered, the gaming machine generally indicates this to the player through one or more visual and/or audio output devices, such as reels, lights, speakers, video screens, and the like.

In the recent years, casino games where multiple players sharing a bonus game were also introduced. Typically, five to eight slot machines surround a shared bonus screen. When the bonus game is triggered, and one or more players may optionally participate in the bonus game. However, the bonus game is short in duration (typically well less than half a minute), all eligible players must be there at the same time to participate, and the passive player(s) do not interact with each other—or with the bonus game. Thus, these group-like bonus games are solitary individual bonus games that are just happened to be played on a common platform. Without interaction with the bonus game, without interaction between players, with the brief nature of the group bonus game, and with the small number of players in a group participating simultaneously, the group-like bonus game offers no additional benefit and improvement over the single player bonus game. In fact, given an opt-in choice to participate in the group-like bonus game, eligible players normally opt-out and wait their turn so that they can play the bonus game by themselves. This defeats the purpose of the group game environment.

SUMMARY

An asynchronous persistent group bonus game allows a player to join and play an asynchronous persistent group bonus game that continues to run even after the player exits the ongoing asynchronous persistent group bonus game. That is, a game-within-a-game bonus environment is created where multiple individual bonus game sessions from multiple gaming machines or devices can be carried out in an asynchronous manner within an always-on global bonus game. In one embodiment, an asynchronous persistent group bonus game system may have a plurality of gaming machines configured to accept a wager from a player to play a game of chance, each of the plurality of gaming machines may have: 1) at least one input device; 2) at least one display; 3) a first processor; and 4) a bonus server, connected to the plurality of gaming machines via a network, having a second processor configured to communicate with each of the plurality of gaming machines. The first processor may be at least configured to: (a) determine when a bonus game session event is triggered; (b) transmit a bonus game session request to the second processor; and (c) receive an end session notification from the second processor. The second processor may be at least configured to: (a) execute the asynchronous persistent group bonus game; (b) receive a bonus game session request from at least one of the plurality of gaming machines; (c) instantiate a bonus game session in the asynchronous persistent group bonus game for the at least one gaming machine; (d) determine when an end session criteria has been triggered for the bonus game session; and (e) transmit an end session notification to the at least one gaming machine if it is determined that the end session criteria has been triggered.

In another embodiment, a method for playing an asynchronous persistent group bonus game on at least one of a plurality of gaming machines configured to accept a wager from a player to play a game of chance may include executing at least one asynchronous persistent group bonus game on a bonus game server, the bonus game server configured to communicate with the plurality of gaming machines, determining whether a bonus game session request has been received from at least one of the plurality of gaming machines, instantiating and inserting a bonus game session into the asynchronous persistent group bonus game for the at least one gaming machine, determining whether an end session trigger has been triggered, and ending the bonus game session when it is determined that the end session criteria has been triggered, wherein the bonus game session ends before termination of the at least one asynchronous persistent group bonus game.

In another embodiment, a method for playing an asynchronous persistent group bonus game on at least one of a plurality of gaming machines configured to accept a wager from a player to play a game of chance may comprise initiating a primary game of chance on the at least one gaming machine, determining whether a bonus event is triggered by the primary game of chance, transmitting a bonus game session request to a bonus server to play a bonus game session within an asynchronous persistent group bonus game, displaying the bonus game session instantiated in an asynchronous persistent group bonus game on a display if it is determined that the bonus event is triggered, and receiving an end session notification to notify the player that the bonus game session had ended, wherein the bonus game session ends prior to the termination of the asynchronous persistent group bonus game.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIG. 8 illustrates an example display of a gaming machine displaying asynchronous persistent group bonus game data.

DETAILED DESCRIPTION

Embodiments are described herein in the context of an asynchronous persistent group bonus game. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

An asynchronous persistent group bonus game allows a player to join and play an asynchronous persistent group bonus game that continues to run even after the player exits the asynchronous persistent group bonus game. Asynchronous gaming allows a player to enter and play the asynchronous persistent group bonus game without having to wait for other players to enter or exit the asynchronous persistent group bonus game. For example, Player A may enter and play a bonus game session in the asynchronous persistent group bonus game. While Player A is playing his asynchronous persistent group bonus game session, Player B may asynchronously enter and play her bonus game session in the same asynchronous persistent group bonus game. Since the asynchronous bonus game is persistent, the asynchronous persistent group bonus game may operate and endure even after a player's bonus game session terminates. Thus, the asynchronous persistent group bonus game may allow players to start and stop individual bonus game sessions without dependency on other player's bonus game sessions. Additionally, many players can concurrently play in the same global game environment, whether or not they belong to the same team or even striving for the same game goals and objectives.

Figure 1:
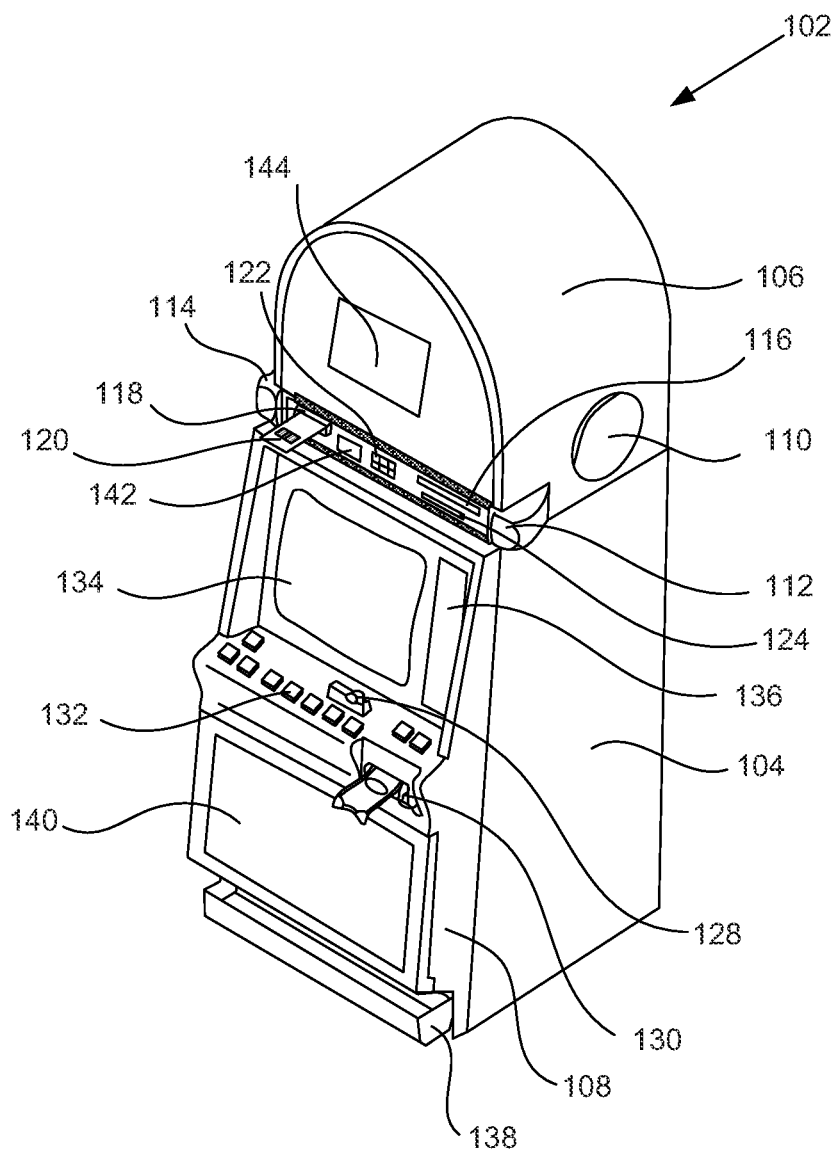
FIG. 1 illustrates an example gaming machine.

FIG. 1 illustrates an example gaming machine. Machine 102 includes a main cabinet 104, which generally surrounds the machine interior (not shown) and is viewable by players. The main cabinet includes a main door 108 on the front of the machine, which opens to provide access to the interior of the machine. Attached to the main door are user-input switches or buttons 132, a coin acceptor 128, and a bill validator 130, a coin tray 138, and a belly glass 140. Viewable through the main door is a video display monitor 134 and an information panel 136. The display monitor 134 will typically be a cathode ray tube, high resolution flat-panel LCD, or other conventional electronically controlled video monitor. The information panel 136 may be a back-lit, silk screened glass panel with lettering to indicate general game information including, for example, a game denomination (e.g. $0.25 or $1). The bill validator 130, user-input buttons 132, video display monitor 134, and information panel 136 are devices used to play a game on the gaming machine 102. The devices are controlled by circuitry (e.g. a master gaming controller) housed inside the main cabinet 104 of the machine 102.

Many different types of games, including mechanical slot games, video slot games, video poker, video black jack, video pachinko and lottery, may be provided with gaming machines of this invention. In particular, the gaming machine 102 may be operable to provide a play of many different instances of games of chance. The instances may be differentiated according to themes, sounds, graphics, type of game (e.g., slot game vs. card game), denomination, number of pay lines, maximum jackpot, progressive or non-progressive, bonus games, etc. The gaming machine 102 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that he wishes to play.

The various instances of games available for play on the gaming machine 102 may be stored as game software on a mass storage device in the gaming machine 102 or may be generated on a remote gaming device (not shown) but then displayed on the gaming machine 102. The gaming machine 102 may execute game software, such as but not limited to video streaming software that allows the game to be displayed on the gaming machine 102. When an instance is stored on the gaming machine 102, it may be loaded from the mass storage device into a random access memory (RAM) for execution. In some cases, after a selection of an instance, the game software that allows the selected instance to be generated may be downloaded from a remote gaming device, such as another gaming machine.

The gaming machine 102 includes a top box 106, which sits on top of the main cabinet 104. The top box 106 houses a number of devices, which may be used to add features to a game being played on the gaming machine 102, including speakers 110, 112, 114, a ticket printer 118 which prints bar-coded tickets 120, a key pad 122 for entering player tracking information, a fluorescent display 116 for displaying player tracking information, a card reader 124 for swiping a magnetic striped card containing player tracking information, and a video display screen 142. The ticket printer 118 may be used to print tickets 120 for a cashless ticketing system. Further, the top box 106 may have a bonus screen 144 which may display a persistent group bonus game. The bonus screen 144 may also display other media when the bonus game is not in session for the player. For instance, the bonus screen 144 may display advertisements, personalized messages, and/or promotional media clips.

Understand that gaming machine 102 is but one example from a wide range of gaming machine designs on which the present invention may be implemented. For example, not all suitable gaming machines have top boxes or player tracking features. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, or a wireless game player. Images rendered from three dimensional (3-D) gaming environments may be displayed on portable gaming devices that are used to play a game of chance. Further, a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 1, when a player wishes to play the gaming machine 102, he or she inserts cash through the coin acceptor 128 or bill validator 130. Additionally, the bill validator 130 may accept a printed ticket voucher as an indicia of credit when a cashless ticketing system is used. At the start of the game, the player may enter playing tracking information using the card reader 124, the keypad 122, and the florescent display 116. Further, other game preferences of the player playing the game may be read from a card inserted into the card reader 124. During the game, the player views game information using the video display 134. Other game and prize information may also be displayed in the video display screen 144 located in the top box 106.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the user-input buttons 132, the video display screen 134 or using some other device which enables a player to input information into the gaming machine. In some embodiments, the player may be able to access various game services such as concierge services and entertainment content services using the video display screen 134 and one or more input/output devices.

During certain game events, the gaming machine 102 may display visual and auditory effects that can be perceived by the player. These effects add to the excitement of a game, which makes a player more likely to continue playing. Auditory effects include various sounds that are projected by the speakers 110, 112, 114. Visual effects include flashing lights, strobing lights or other patterns displayed from lights on the gaming machine 102 or from lights behind the belly glass 140. After the player has completed a game, the player may receive coins or game tokens from the coin tray 138 or the ticket 120 from the printer 118, which may be used for further games or to redeem a prize. Further, the player may also receive a ticket 120 for food, promotional merchandise, or games from the printer 118.

Figure 2:
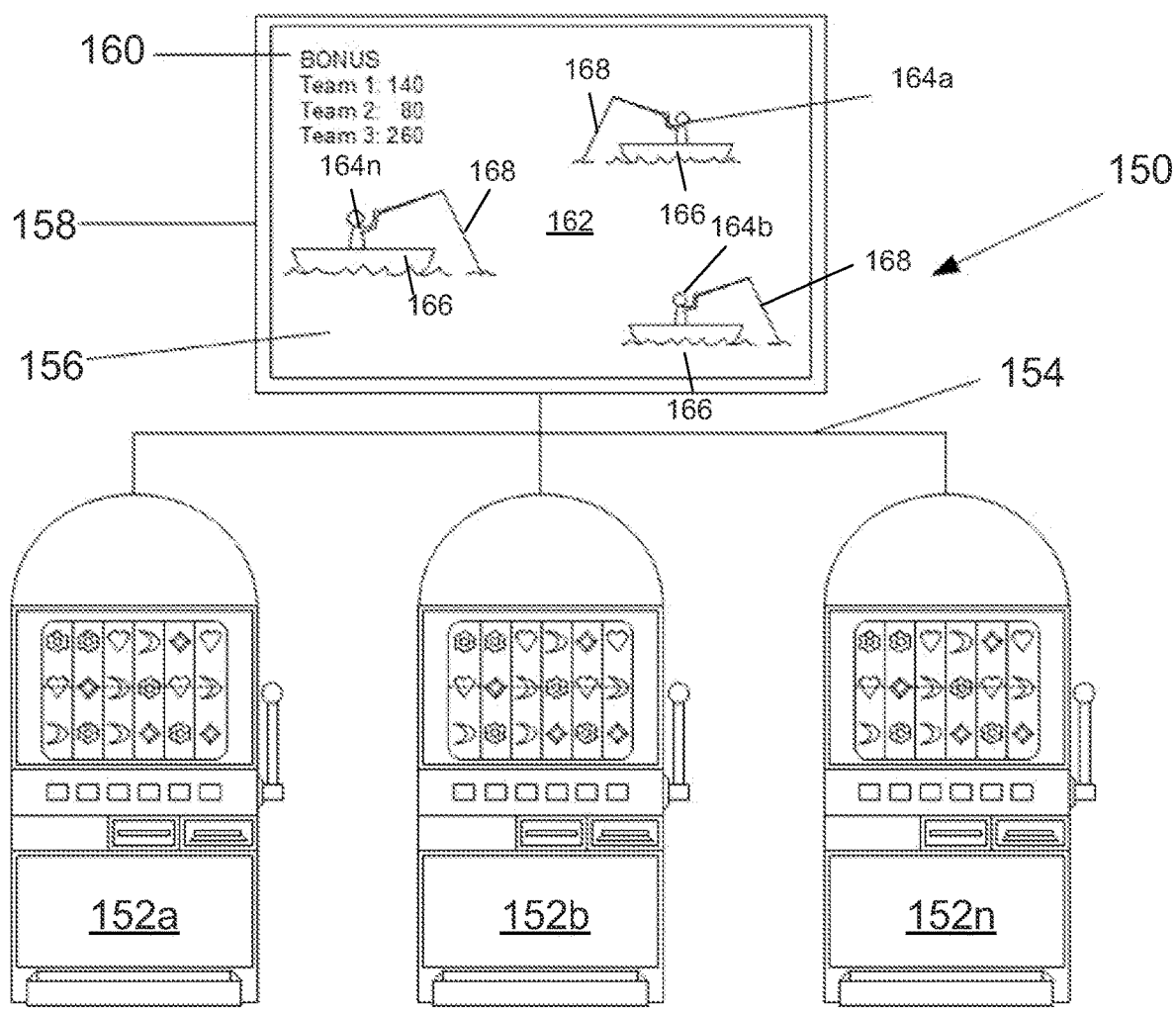
FIG. 2 illustrates one embodiment of an asynchronous bonus gaming system.

FIG. 2 illustrates one embodiment of an asynchronous persistent group bonus gaming system. The asynchronous bonus gaming system 150 may include a plurality of gaming machines 152a, 152b, 152n (where n is an integer). Each of the plurality of gaming machines 152a-n may be configured to communicate with a central display 158 via network 154. In one embodiment, the gaming machines 152a-n may be configured to communicate with the central display 158 via a wide-area network. The central display 158 may be configured to display a bonus gaming environment 156 of the asynchronous persistent group bonus game. The bonus game environment 156 may include information 160 pertinent to the asynchronous persistent group bonus game, such as team score, individual score, current players playing the asynchronous persistent group bonus game, top players, top teams, progressive jackpot awards, and the like.

Figure 3:
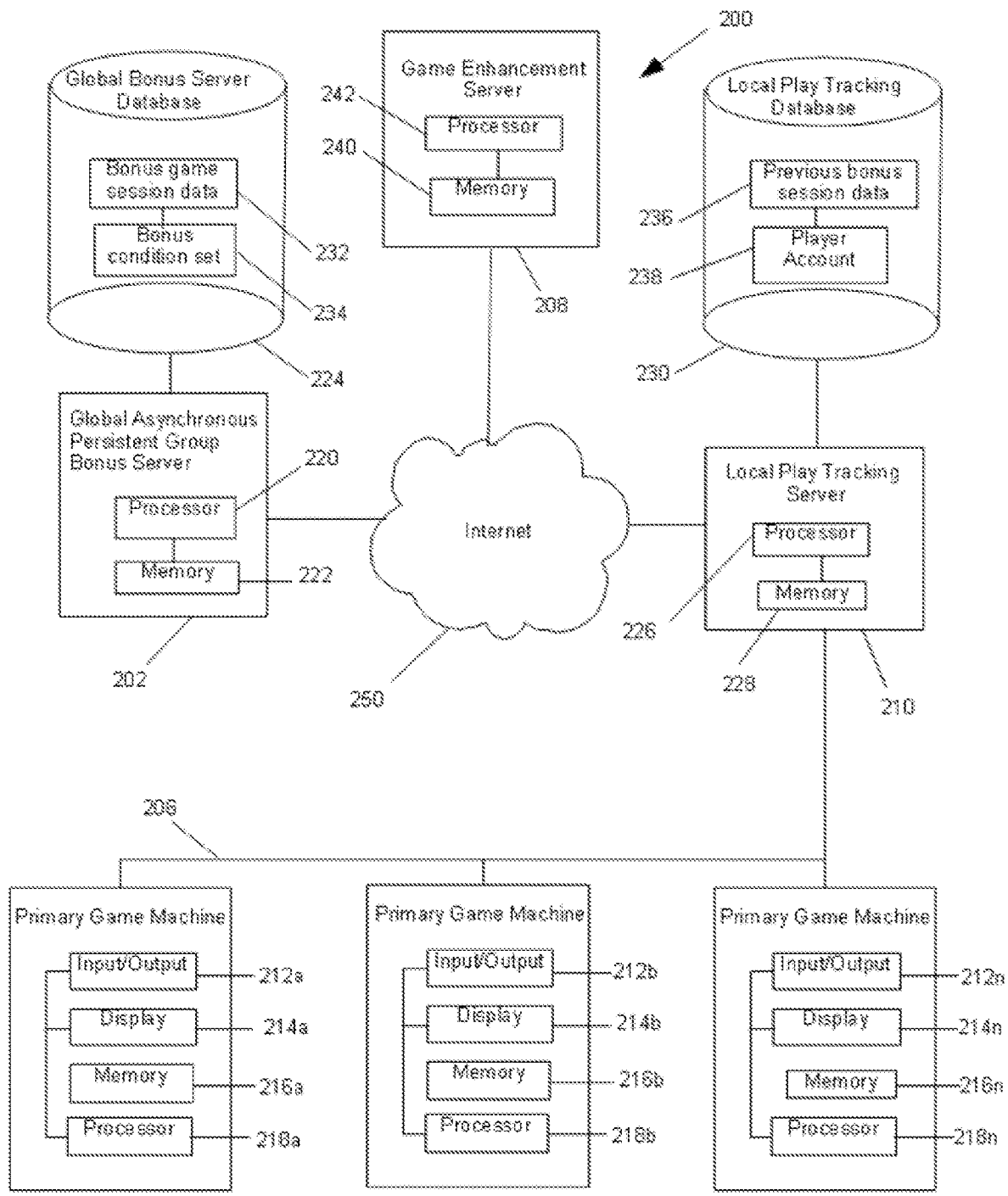
FIG. 3 illustrates a block diagram of another embodiment of the asynchronous bonus gaming system.

FIG. 3 illustrates a block diagram of another embodiment of the asynchronous persistent group bonus gaming system. The asynchronous persistent group bonus game system 200 may include at least one global asynchronous persistent group bonus server 202 configured to communicate with a plurality of gaming machines 204a, 204b, and 204n via a wide area network (WAN) such as the Internet 250 and local network 206. The advantage of using the Internet is that many casinos from distant locations can be linked together in one common game. This allows thousands of players to be active in the game at any given time, creating a live and exciting gaming environment. Alternatively, a simpler architecture is not to connect via a WAN (some gaming jurisdictions may not allow a WAN connection) so that the global asynchronous persistent group bonus server 202 is connected directly to local network 206. The global asynchronous persistent group bonus server 202 may also be configured to communicate with a game enhancement server 208 and a local play tracking server 210 via network 206. The network 206 may be a client-server network, a peer-to-peer network, a wired or wireless network, a wide area network (WAN), a local area network (LAN), or any other type of network.

The gaming machines 204a-n may be physically located in a single location, such as a casino, or may be spread out over multiple locations, such as multiple airports, grocery stores, casinos, different states or countries, or any other locations. Thus, the network 206 may include local as well as wide area network links as described previously.

In an implementation particularly suited for a multi-property architecture, the global asynchronous persistent group bonus server 202 and the game enhancement server 208 may be located in a remote location (e.g., such as at the casino operator's corporate headquarter) and connected to the multiple local game tracking servers 210 at the local casino's (one local server 210 per casino, for instance) via the Internet or a private wide-area network. Of course, if the system deployment is for a small group of gaming machines (e.g., in one carousel or bank of gaming machines) in one local casino, all the functions performed by the game enhancement server 208, the global asynchronous persistent group bonus server 202, and the local play tracking server 210 may be consolidated to one local carousel server. A local area network is all that is required in this case.

Gaming machines 204a-n may have at least one input/output device 212a-n, at least one display 214a-n, a memory 216a-n and at least one processor 218a-n. The gaming machines 204a-n may be configured to accept a wager from the player to play a game of chance. The at least one input/output device 212 may be user-input switches, buttons, touch-screen display, speakers, lights or any other known input/output device as described above with reference to FIG. 1. A player may use the input/output device to make decisions or to play the game of chance on the gaming machine 204a-n. For example, a player may vary his or her wager on a particular game, select a prize for a particular game selected from a prize server, or make game decisions that affect the outcome of a particular game. In other embodiments, the player may be able to access various game services such as concierge services and entertainment content services using the display device 214 a-n and one or more input/output devices 212 a-n.

The at least one display 214a-n may be configured to communicate with the processor 218a-n to display gaming images for the primary game of chance or the asynchronous persistent group bonus game. The display 214a-n may be any device used for displaying or presenting images to the player. The display 214a-n may be any size or shape and may be located anywhere on the gaming machine 204a-n.

The at least one memory 216a-n may be any storage device used to store data or programs, sequences of instructions, pay tables, event probabilities, and the like. The memory 216a-n may be any type of memory such as non-volatile memory, non-volatile random access memory (NV-RAM), ferromagnetic hard disk drive, optical disk drive, magneto resistive random access memory (MRAM), flash memory, or any other type of data storage solution that will not lose stored data or data loaded into memory in the event of a power loss or machine malfunction.

The processor 218a-n may be configured to communicate with the display 214a-n, memory 216a-n, input/output device 212a-n, or any other device of the gaming machine 204a-n. The at least one processor 218a-n may be configured to determine when a bonus event is triggered, transmit a bonus game session request to a processor 220 on the global asynchronous persistent group bonus server 202 via network 206, and receive an end session notification from the processor 220 on the global asynchronous persistent group bonus server 202.

Bonus events may be triggered when specific outcomes are played on the primary game of chance. For example, a bonus event may be triggered when a bonus symbol is played on the primary game of chance. In another example, the bonus event may be triggered when a combination of symbols are played on the primary game of chance. In yet another example, the bonus event may be triggered when the denomination of the wager meets a predetermined threshold and the outcome of the primary game is either a bonus symbol or a combination of symbols. For example, a bonus triggering event may occur when a player bets the maximum amount of credits and at least one bonus symbol is played on the primary game of chance.

When the bonus triggering event occurs, a bonus game session request may be transmitted from processor 218a-n to the global asynchronous persistent group bonus server 202 via network 206. The bonus game session request informs the bonus server that a bonus triggering event occurred on the gaming machine 204a-n and requests that the player play a bonus game session in the asynchronous persistent group bonus game.

The global asynchronous persistent group bonus server 202 may have a processor 220 and memory 222. The memory 222 may be any storage device as discussed above that may be configured to at least store data, programs, achievements awarded, bonus game limitations, pay tables, and any other gaming information. The global asynchronous persistent group bonus server 202 may also store the game states of the bonus session and for the asynchronous persistent group bonus game. The state of the asynchronous persistent group bonus game may affect how the bonus session is instantiated in the asynchronous persistent group bonus game.

The processor 220 may be configured to execute an asynchronous persistent group bonus game, receive a bonus game session request from at least one of the plurality of gaming machines 204a-n, instantiate a player's bonus game session into the asynchronous persistent group bonus game for at least one of the gaming machines 204a-n, determine whether an end session trigger has been triggered for the bonus game session, and transmit an end session notification to the gaming machine 204a-n if it is determined that the end session trigger has been triggered.

When the global asynchronous persistent group bonus server 202 receives a bonus game session request for at least one of the gaming machines 204a-n, the bonus game session may be instantiated into the asynchronous persistent group bonus game. When the bonus game session is instantiated, the bonus game session is created within the asynchronous persistent group bonus game and the player plays a real instance or particular realization of the bonus game session. In other words, the bonus game session is configured to allow the player to play the bonus game session within the always-on asynchronous persistent group bonus game. For example, particular assets of the bonus game session may be configured into the asynchronous persistent group bonus game, identifying data for the particular bonus game session, starting the bonus game session in a certain location in the asynchronous persistent group bonus game environment, or any other configuration data for the bonus game session. Instantiation of the bonus game session may also include creating an avatar for the player to play the asynchronous persistent group bonus game, periodically or continually updating the player's game state data, sending the player's game state data to the global asynchronous persistent group bonus server 202, or any other acts required to play the asynchronous persistent group bonus game.

In one implementation, the graphical global gaming environment is presented to the player at the local display 134. All the updates from various gaming devices are processed, rendered, and streamed to the gaming device's display screen from the global gaming bonus server. In another implementation, high-level commands are given to the local gaming devices. The local gaming device processes, renders, and displays the resultant graphics. In all cases, the player's interaction and control (e.g., via the touchscreen) are captured and routed to the proper processor (the remote global gaming bonus server, or the local gaming device) to process, render, and display the resultant graphics on the player's display.

A bonus game session for each player may be played asynchronously from other players who may or may not belong to the same group. Typically, a player plays the primary game and earns the right to enter the always-on global bonus group game. Other players may be playing, exiting, or entering as well. When he finishes his play session, he is returned to his primary game, while the global bonus group game continues to persist to entertain other players who are playing, exiting, or entering. Each of the plurality of gaming machines 204a-n may communicate via network 206 with the global asynchronous persistent group bonus server 202 regardless of previous, current and/or subsequent communications between the global asynchronous persistent group bonus server 202 and the other gaming machines 204*a-n*. For example, a bonus game session may be instantiated in an asynchronous persistent group bonus game for a player playing gaming machine 204*a*. While gaming machine 204*a* is playing a bonus game session in the asynchronous persistent group bonus game, another bonus game session may be instantiated in the same asynchronous persistent group bonus game for a player playing gaming machine 204*b*. When the bonus game session ends for gaming machine 204*a*, the asynchronous persistent group bonus game may continue to allow the player playing the bonus game session on gaming machine 204*b* to finish his bonus game session.

When a bonus game session ending event occurs for a bonus game session, an end session notification may be transmitted from the global asynchronous persistent group bonus server 202 to the respective gaming machine 204*a-n* via network 206. The end session notification may be displayed on the central display or on any display on the gaming machine 204*a-n*. The end session notification may be any transmitted message that communicates to the player that the bonus game session has terminated. For example, the end session notification may be displayed as "Your bonus game session is complete." The bonus game session may end prior to termination of the asynchronous persistent group bonus game.

A bonus game session ending event may be triggered when certain bonus game session events occur. For example, a bonus game session ending event may be the end of a pre-defined period of time or a pre-defined critical threshold. For example, the pre-defined critical threshold may be once the player achieves 1,000 points playing the bonus game session. In another example, the pre-defined critical threshold may be when a team goal of 1,000 points is achieved. In still another example, the bonus game session ending event may occur once the player has played the bonus game session for two minutes.

In one embodiment, a player may create a bonus game session condition set for use when playing the bonus game session. A list of bonus conditions may be displayed on display 214*a-n* and the player may use the input/output device 212*a-n* to select the desired bonus condition. The bonus game session condition set may be any user-selected conditions that can affect the dynamics of the bonus game session. For example, a bonus condition may be a list of assets or tools the player may use when playing the bonus game session. In another example, the bonus condition may be a specific team the player would like to join when playing the bonus game session. In still another example, the bonus condition may be selecting a specific location, or proximity to other teammates, etc., inside the asynchronous persistent group bonus game that the player would like to be positioned to play the bonus game session.

Once the bonus game session condition set is created, it may be transmitted to the global asynchronous persistent group bonus server 202 via network 206. The bonus conditions 234 may be stored in the bonus server database 224 and the global asynchronous persistent group bonus server 202 may use the bonus game session condition set to configure the bonus session for the player.

In one embodiment, the asynchronous persistent group bonus game may be played by multiple players to achieve a team goal and/or obtain a winning goal of the asynchronous persistent group bonus game. Teams can also play against or with other teams in a competitive manner, in a cooperative manner, or a team can simply play its own game without other teams. The nature of the team play is configured in a bonus game session condition as described previously. Preferably, the team play configuration is done, either by the players or a casino operator or the bonus server, prior to any team member entering the asynchronous persistent group bonus game. However, teams and team configuration can also be set up spontaneously inside the global bonus game environment. In another embodiment, the asynchronous persistent group bonus game may be played by a team of only one player.

The bonus game session data 232 for the team or individual bonus game session may be stored in the global asynchronous persistent group bonus server database 224. For example, an individual achievement or goal may be to obtain a certain amount of credits within a predetermined amount of time. In another example, a team goal or achievement may be to obtain a certain amount of credits before another team achieves the same amount of credits. In still another example, the team goal or achievement may be to obtain the highest number of credits in a predetermined period of time. Beside these configuration data, the bonus game session data may also include other data related to the global asynchronous persistent group bonus game such as team interim progress data, individual player progress data, interim scores, game history, credits received, intermediate prizes, jackpots awards, global game graphics, environmental parameters (trees, mountains, ponds, characters, story, etc.), and the likes. Thus, the bonus server database 224 is the central data repository for all data for all teams and players.

When the bonus game session ends for a player, an interim bonus award notification may be transmitted from the global asynchronous persistent group bonus server 202 to the respective gaming machine 204*a-n* via network 206. The interim bonus award notification may include information such as whether the player accumulated any bonus credits and prizes from playing the bonus session, as well as other progress made. The bonus award notification may also include information as to whether the player contributed credits to the overall team goal. For example, if the player was able to achieve all or a portion of the goals associated with the bonus session game, the player may be awarded partial or full credits for the bonus session. Additionally, partial or full credit may be awarded for contributing to an overall team goal.

In some embodiments, the credits awarded may be based on the total number of credits or points obtained during the bonus game session. For example, the player may be awarded 1 credit for every 5 points obtained playing the bonus game session. In another example, the player may be awarded 1 credit for every 1 point obtained playing the bonus game session. In still another embodiment, the player may be awarded a set number of credits for reaching a certain level or achievement. For example, the player may be awarded 10 credits if he obtains 100 points playing the bonus game session. The award credits may be redeemable for cash, credits to play other games of chance, purchase additional bonus game assets to use when playing the asynchronous persistent group bonus game, and/or other non-monetary goods or services, such as a buffet or show tickets.

A local game play tracking server 210 may be configured to communicate with each of the plurality of gaming machines 204*a-n* and the global asynchronous persistent group bonus server 202 via network 206. The local play tracking server 210 functions as a local asynchronous persistent group bonus game server. Having a local server improves response time for the local game machines. Also, the local server can take over the job of serving and coordinating the global bonus game even if the network connection with the central server is lost. In this case, the local data and events generated by the local gaming machines is simply buffered in the local server's memory until the network connection is restored.

Since the local play tracking server mirrors some of the core functions of the global asynchronous persistent group bonus game server (e.g., such as displaying the global game graphics and coordinate activities of players), it contains an abbreviated copy of the global game environment data as well as a copy of all player activities and events occurred in the local casino. For example, it may contain only data for local players in the last several days instead of the comprehensive data for thousands of players across the country for the last 3 months.

The local game tracking server 210 may have a processor 226 and a memory 228. If the player previously played the asynchronous persistent group bonus game, the player's previous bonus game session data 236 may be saved on the local game tracking server 210. Thus, the player's bonus game session data 236 may be obtained from the global asynchronous persistent group bonus server 202 for the player to use to play the bonus game session. An example of saving the asynchronous persistent group bonus game is discussed in co-pending application Ser. No. 12/581,115 entitled "Preserving Game State Data For Asynchronous Persistent Group Bonus Games," filed Oct. 19, 2009, which is incorporated herein by reference in its entirety for all purposes When a gaming machine 204*a-n* is granted a bonus game session request, the local game tracking server 210 may locate the player's account 238 and previous bonus session game data 236. The player account 238 may be identified by any known means such as via the player tracking ID card, player log-in identification, the barcode on a paper voucher, and the like. When the bonus game session ends, the player's bonus game session data 232 may be updated and stored in the local game tracking database 230.

Due to the continuous and persistent nature, the global asynchronous bonus group game could continue and be played for weeks or months. The risk of being static and stale may be possible. Thus, the game may be optionally refreshed with periodic updates of additional or new features and enhancements from the game enhancement server 208. The enhancements and features can be game-related (e.g., prizes, points, jackpots, better paytables, pay multipliers for the primary games, wild symbols, and the like), or non-game related (e.g., scenery, background music, avatars, food and drink services, and the like). Depending on the rules and regulations of each gaming jurisdiction (or even of the casino operator) that the game device is operating in, one or both of these types of enhancements and features can be offered. In one embodiment, the updates of additional or new features and enhancements may be based upon the promotions, the time, or tournaments offered at the casino for that month. For example, if the buffet was offering a two-for-the-price-of-one meal deal on Valentine's Day, the marketing advertisement for the offer can be sent from the enhancement server 208 to be displayed on the global asynchronous bonus group game. In another example, the marketing advertisement may be displayed during a predefined period of time, such as between 3 pm to 5 pm. In another example, the marketing advertisement may be displayed for one week.

In another embodiment, the additional or new features and enhancements may be based upon the month itself. For example, if the global asynchronous bonus group game is being played in December, the enhancement server 208 may refresh the global asynchronous bonus group game such that the fisherman (see, Example 1) may be fishing on the pond while snow is falling. In another example, if the global asynchronous bonus group game is being played in October, the enhancement server 208 may refresh the global asynchronous bonus group game such that each avatar may be displayed wearing a Halloween costume, Halloween characters may be displayed, and Halloween music may be played in the global asynchronous bonus group game.

In one embodiment, updates to the asynchronous persistent group bonus game may be compiled according to local requirements, configured, and saved in game enhancement server 208. The game enhancement server 208 may send updates or modifications to the global asynchronous persistent group bonus server 202 via network 206, or if connected in a WAN architecture, via the Internet 250 and network 206. For example, a new asynchronous persistent group bonus game level may be transmitted to the global asynchronous persistent group bonus server 202. In another example, additional contests, prizes and jackpots from a third-party sponsor maybe added, during the promotional period, to the global asynchronous persistent group bonus server 202. In yet another example, new entertainment features such as music, video clips, sceneries, and the like, are added to keep the global game environment alive and exciting. Updates and/or changes to the asynchronous persistent group bonus game may be stored and executed on the global asynchronous persistent group bonus server 202.

A bonus termination event may occur to terminate the asynchronous persistent group bonus game. The global asynchronous persistent group bonus server 202 may detect when a bonus termination event occurs. In one embodiment, the bonus termination event may occur upon expiration of a predetermined period of time. In another example, the bonus termination event may occur once a team achieves a predetermined score or point amount. In still another embodiment, the bonus termination event may occur upon the occurrence of a certain event on the asynchronous persistent group bonus game. For example, if a player locates a bonus termination device while playing the asynchronous persistent group bonus game, the asynchronous persistent group bonus game may terminate.

Once the asynchronous persistent group bonus game ends, a determination may be made to determine a final award for the player(s). If the asynchronous persistent group bonus game was played in teams, each of the players on the team will be notified of the final award. If the asynchronous persistent group bonus game was played by a one-member team, then the single player will be notified of the final award. For example, the asynchronous persistent group bonus game may have a team goal of 1,000 points. Once the 1,000 points is reached, all the players on the team are notified that the asynchronous persistent group bonus game has ended and whether a final award will be distributed. The award may be distributed and the players may be notified via electronic mail, regular mail, text message, telephone, player account message, or any other methods of communication such as use of the player messaging screen on a gaming machine or at a kiosk.

Once the asynchronous persistent group bonus game is terminated, the global asynchronous persistent group bonus server 202 may execute a new asynchronous persistent group bonus game. In another embodiment, the same asynchronous persistent group bonus game may continue to determine second and third place teams. In yet another embodiment, a new asynchronous persistent group bonus game maybe downloaded from the game enhancement server 208 to bonus server 202 for execution.

Outcomes of the asynchronous persistent group bonus game may be generated by a random number generator (RNG) in real time as the player plays, or can be pre-generated during the setup phase of the asynchronous persistent group bonus game, depending on what is allowed at the local game jurisdiction. The RNG can be used to generate the size of a prize, or the location of the prize, or both. For example, the RNG may pre-generate a random number for a location and award size on the asynchronous persistent group bonus game. Should the player choose that location to start the bonus game session, the player may be awarded the number of points or credits based upon the prize stored at the location. In another example, the pre-generated RNG outcomes may be used to position certain bonus game assets throughout the asynchronous persistent group bonus game. Should the player land upon a certain position having the bonus game asset, the player may use the bonus game asset to play the bonus game session. For many jurisdictions, a real-time generated RNG outcome may be required. The bonus game implementation can be the same except that the player's bonus game session outcome is generated as the player plays.

Figure 4A:
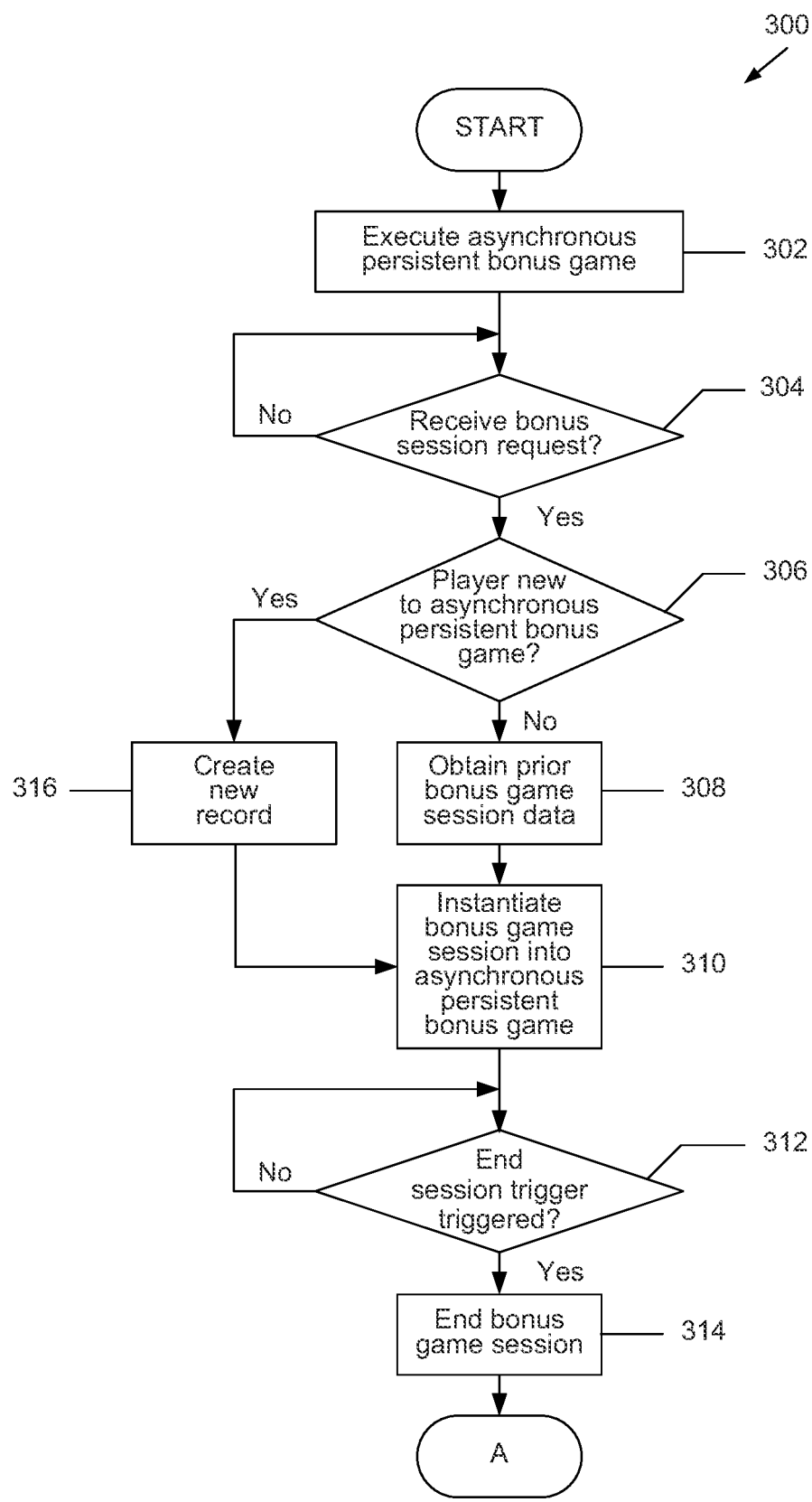
FIGS. 4A-4C illustrate flow diagrams of example methods for playing an asynchronous persistent group bonus game.
Figure 4B:
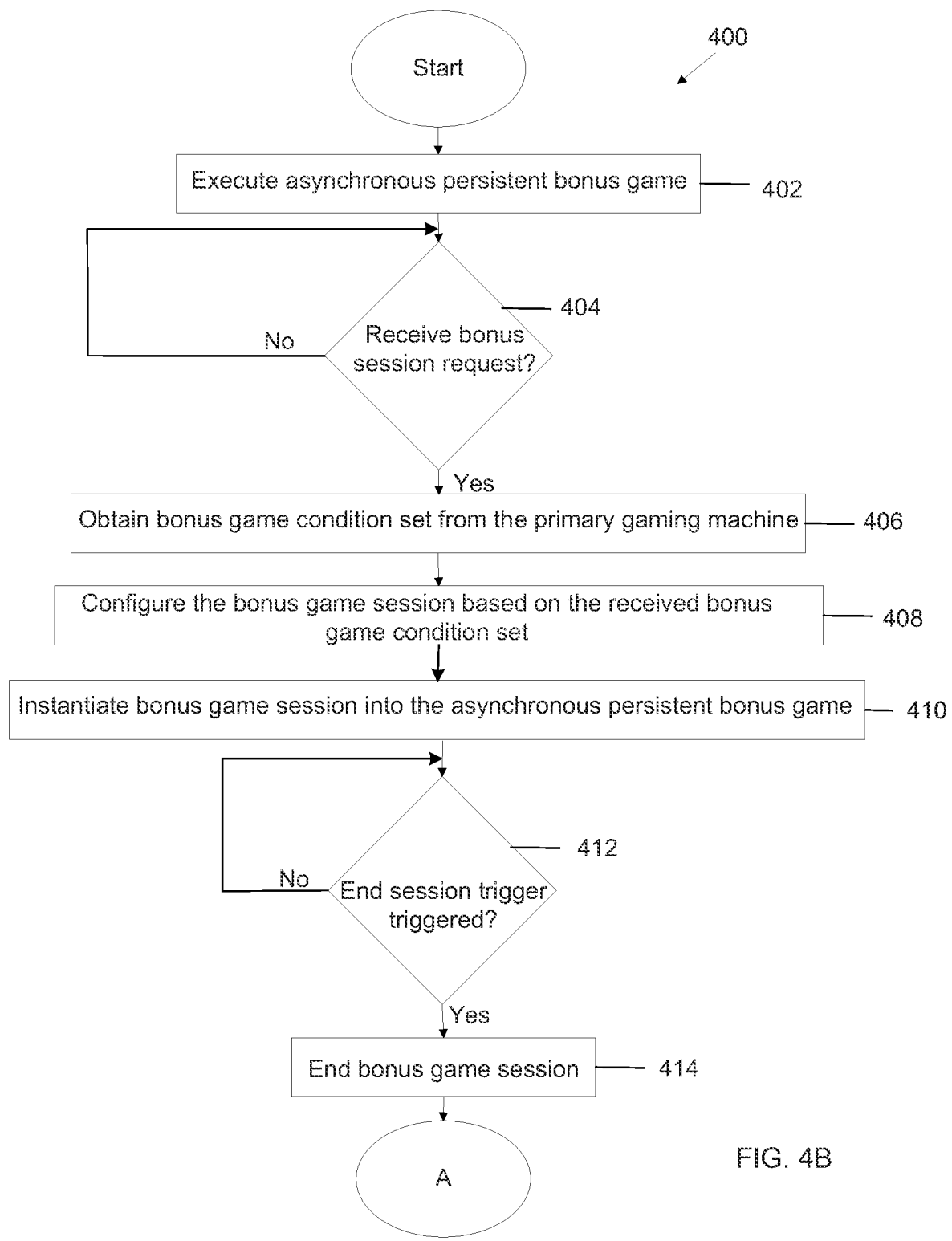
Figure 4C:
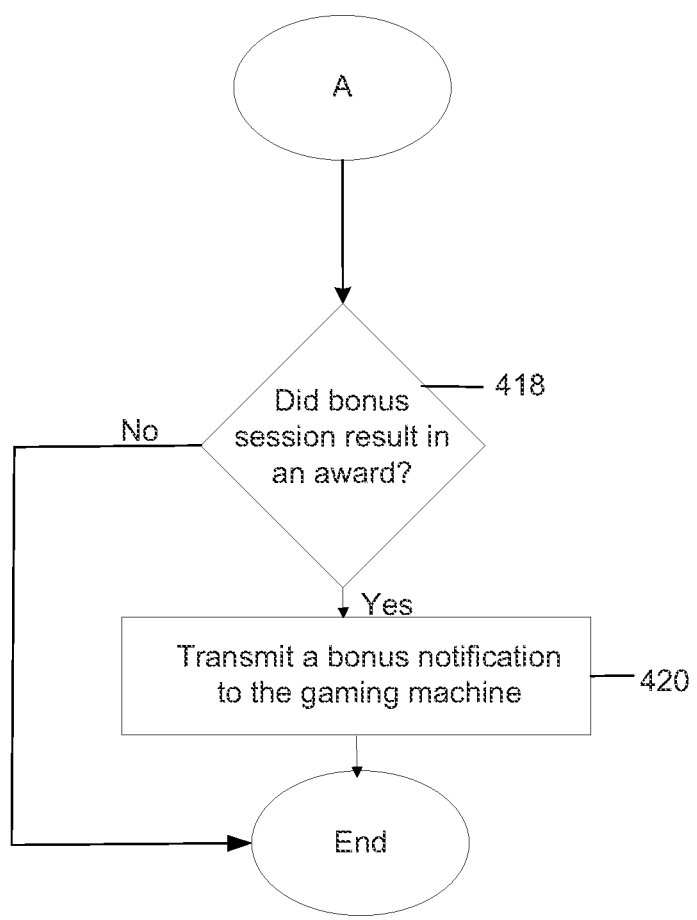

FIGS. 4A-4C illustrate flow diagrams of example methods for playing an asynchronous persistent group bonus game. Referring to FIG. 4A, a method for playing an asynchronous persistent group bonus game 300, begins with the execution of the asynchronous persistent group bonus game at 302. The asynchronous persistent group bonus game may be executed via a bonus server, gaming server, or any other server on a gaming network. The asynchronous bonus game allows a player to enter and exit a bonus gaming session in the asynchronous persistent group bonus game without regard to other players. In other words, a player may enter the asynchronous persistent group bonus game and play a bonus gaming session while another player's bonus gaming session is in progress. For example, Player A may play a bonus game session in the asynchronous persistent group bonus game. While Player A is playing his bonus game session, Player B may asynchronously enter and play her bonus game session in the same asynchronous persistent group bonus game. Thus, the asynchronous persistent group bonus game may allow players to start and stop individual bonus game sessions without dependency on other player's bonus game sessions. Although asynchronous game entry is the normal operation, players can choose to enter the bonus game synchronously by saving a bonus session for later use. For example, a player eligible to play a 3-minute bonus session may choose to save the bonus session until his buddy sitting next to him receive a bonus session. Both players can then enter the bonus game substantially at the same time so that they may both concurrently play the bonus game at the same time.

Additionally, since the asynchronous group bonus game is persistent, the bonus game may endure even after a player's individual bonus game session terminates. Thus, the individual bonus game sessions may end prior to termination of the asynchronous persistent group bonus game.

The asynchronous persistent group bonus game may be any type of bonus game and use various types of themes. The asynchronous persistent group bonus game may be a fishing game, shooting game, treasure hunt, card game, a virtual casino, or the like. For example, if the asynchronous persistent group bonus game is a fishing game, the player may win a bonus award in the bonus game session if a fish is caught by the player. In one embodiment, the amount of the bonus award may be based on the weight of the fish caught.

If a bonus game session request was received at 304 from any of the plurality of gaming machines, a determination is made as to whether the player is new to the asynchronous persistent group bonus game at 306. If the player is new, a new record in the global bonus server database 224 and local game tracking server database 230 is generated to store the player's activities and preferences. The bonus game session request may be sent from the gaming machine as a result of the player obtaining a winning bonus payline while playing the primary game of chance on the gaming machine. For example, the player may have obtained a certain number of bonus symbols while playing the primary game of chance. If no bonus game session request is received at 304, no determination is required.

If the player is new to the asynchronous persistent group bonus game at 306, then a new bonus game session will be created for the player and the new bonus game session will be instantiated at 310. However, if the player has previously played a bonus game session in the asynchronous persistent group bonus game at 306, prior bonus game session data may be retrieved from the global asynchronous persistent group bonus game database at 308 to allow the player to use previous assets and continue playing the asynchronous persistent group bonus game with data from the previously saved bonus game session. In another embodiment, the player may select to start over and not use any assets or data from the previously saved bonus game session.

The bonus game session may be instantiated into the asynchronous persistent group bonus game at 310. The bonus game session may be displayed on either a group display or an individual display on a secondary screen of the player's gaming machine. Instantiating the bonus game session into the asynchronous persistent group bonus game may allow the player to use controls from the gaming machine to control or manipulate play in the asynchronous persistent group bonus game. As previously discussed above, the bonus game graphics and sounds maybe streamed from a remote bonus server, or rendered locally at the gaming machine.

A determination is then made as to whether an end session trigger has been triggered at 312. The end session trigger may be based upon time, player input, an occurrence or non-occurrence of an event, or the like. In one embodiment, the end session trigger may occur after the player has played in the asynchronous persistent group bonus game for a predetermined amount of time. For example, a bonus game session might be set for a predetermined bonus play time of 2 minutes and when 2 minutes elapses, an end session trigger is triggered. In another embodiment, the end session trigger may be triggered when the player reaches a goal. For example, the player may move throughout a game board in the asynchronous persistent group bonus game and choose a point on which to search for a prize. If the player wins a bonus prize, the end session trigger may be triggered. In another embodiment, the end session trigger may be an input received from the player. For example, the player may push a button to pause or end the bonus game session in the asynchronous persistent group bonus game.

If an end session trigger has not been triggered at 312, the asynchronous persistent group bonus game continues with the other players. However, if the end session trigger is received at 312, the bonus game session ends at 314 and the player may be removed from the asynchronous persistent group bonus game.

FIG. 4B illustrates another embodiment of a method for playing an asynchronous persistent group bonus game. The asynchronous persistent group bonus game method 400 starts by executing the asynchronous persistent group bonus game at 402. A determination is made as to whether a bonus game session request is received from any of the plurality of gaming machines at 404.

If it is determined that a bonus game session request has been received at 404, a bonus game condition set may be obtained and/or received from the gaming machine at 406. The bonus game session condition set may be any user-selected conditions that can affect or influence the dynamics and/or outcome of the bonus game session. For example, the bonus game session condition set may include the player's preference of assets to use when playing the asynchronous persistent group bonus game. This allows for the appearance that the player has some control or influence over the bonus game session. In one example, if the asynchronous persistent group bonus game is a fishing game, the bonus game session condition set may be the type of fishing rod and/or lure the player would like to use while playing the bonus game session in the asynchronous persistent group bonus game. The different types of rods and/or lures may act to increase the player's chances of winning a bonus prize. In one implementation, the improved chance is done by narrowing the number range that the RNG outcome is mapped to. For example, a rod may have two hooks instead of one, which may double the player's chance of winning an award. In another example, the player may select an avatar to use when playing the asynchronous persistent group bonus game.

The bonus game session may be configured based upon the received bonus game condition set at 408. The bonus game session may be configured to include the probability of winning a prize based on player's preferences in the bonus game condition set. The bonus game session may then be instantiated in the asynchronous persistent group bonus game at 410.

A determination is then made as to whether an end session trigger has been triggered at 412. The end session trigger may be based upon time, player input, an occurrence or non-occurrence of an event, or the like. In one embodiment, the end session trigger may occur after the player has played in the asynchronous persistent group bonus game for a predetermined amount of time. For example, a bonus game session might be set for a predetermined bonus play time of 45 seconds and when 45 seconds elapses an end session trigger is triggered. In another embodiment, the end session trigger may be triggered when the player reaches a goal. For example, the player may move throughout a game board in the asynchronous persistent group bonus game and choose a point on which to search for a prize. If the player wins a bonus prize, the end session trigger may be triggered. In another embodiment, the end session trigger may be an input received from the player. For example, the player may push a button to pause or end the bonus game session in the asynchronous persistent group bonus game.

If an end session trigger has not been triggered at 412, the bonus game session continues with existing players. However, if the end session trigger is received at 412, the bonus game session ends at 414 and the player may be removed from the asynchronous persistent group bonus game.

FIG. 4C illustrates an embodiment of a method for notifying a player of a bonus award. Whether the bonus award is an interim award (i.e., given out as the player plays) or a final award (i.e., awarded to the team as a goal is achieved), the implementation is the same. If the bonus session resulted in an award at 418, a bonus notification may be transmitted to the gaming machine at 420. Whether or not an award is going to be awarded during the bonus game session may be determined by any known methods, such as with the use of a random number generator. The award may be any type of award such as monetary award, credits, or non-monetary awards. In one embodiment, the non-monetary awards may include bonus game assets for the player to use in future bonus game sessions. The bonus award may be transmitted to and displayed at the gaming machine, sent to the player account, and/or sent to the player via any known means, signal, sounds, text, or the like.

Figure 5:
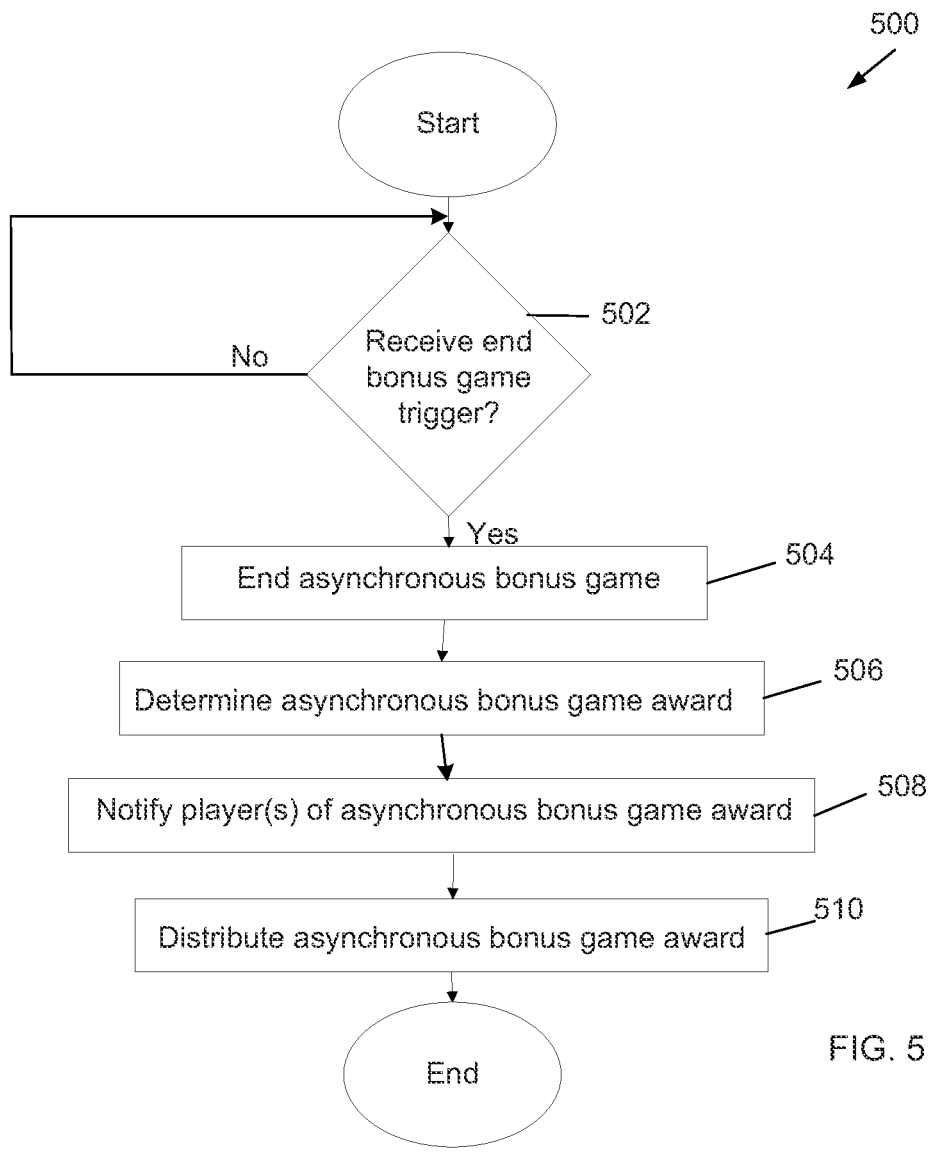
FIG. 5 illustrates a flow diagram of an embodiment of a method for ending the asynchronous persistent group bonus game.

FIG. 5 illustrates a flow diagram of an embodiment of a method for ending the asynchronous persistent group bonus game 500. After a bonus game session ends, a determination may be made as to whether an end of the global asynchronous persistent group bonus game condition has been triggered at 502. The end bonus game trigger can be any event that ends the asynchronous persistent group bonus game such as the ending of a predetermined time interval, a completion of a task, an occurrence or non-occurrence of an event, or the like. In one embodiment, the end bonus game session trigger may occur after a predetermined amount of time such as 10 days, 1 month, or 3 months. In another embodiment, the end bonus game trigger may be triggered when an overall game goal has been reached. For example, in a fishing game, once an individual or team reaches a goal of catching 1000 pounds of fish, the end condition of the global asynchronous persistent group bonus game may be triggered.

Once the end bonus game trigger is triggered at 502, the asynchronous persistent group bonus game ends at 504. An asynchronous persistent group bonus game ending signal may be transmitted to at least one of the gaming machines to inform the player(s) that the asynchronous persistent group bonus game has ended.

Once the asynchronous persistent group bonus game ends at 504, the asynchronous persistent group bonus game award is determined at 506. The asynchronous persistent group bonus game award may be based upon any factors dependent upon the asynchronous persistent group bonus game. For example, if the asynchronous persistent group bonus game is a fishing game, the asynchronous persistent group bonus game award may be based upon the total number of pounds of fish caught by each player, calculated proportionately.

The asynchronous persistent group bonus game award may be a predetermined award or a progressive jackpot type award or a mystery bonus award. The asynchronous persistent group bonus game award may be any type of award, such as monetary, non-monetary, credits used toward playing other games of chance, or used toward purchasing assets to play an asynchronous persistent group bonus game.

The player(s) may be notified of the asynchronous persistent group bonus game award at 508 so that the asynchronous persistent group bonus game award may be distributed to the player(s) at 510. The player(s) may be notified of the asynchronous persistent group bonus game award through different methods. In one embodiment, the notification may be presented on a display of the gaming machine and/or the central display 158 (FIG. 2). In another embodiment, the player(s) may be notified via electronic mail, letter, text message, or any other means. Once notified, the asynchronous persistent group bonus game award may be distributed to the player(s) at 510.

Example 1

For exemplary purposes only and not intended to be limiting, an example asynchronous persistent group bonus game will be described. Although described with reference to a fishing-type bonus game, this is not intended to be limiting as any type of game may be developed for the asynchronous persistent group bonus game.

Referring back to FIG. 2, once a bonus game session is triggered on at least one of the gaming machines 152*a-n*, the asynchronous persistent group bonus game may begin and the asynchronous persistent group bonus game environment 156 may be presented on the secondary display 144 (FIG. 1) and/or on the central community display 158. The asynchronous persistent group bonus game may be a fishing game where the bonus game environment may be a pond 162 and the avatars 164*a-n* may be fishermen. Each player or avatar 164*a-n* may have bonus assets 804 to use when playing the bonus game. Such assets may be displayed on a display of the gaming machine 152*a-n*. Such assets may be a boat 166, hooks or lures (not shown), fishing rod 168, or any other items to assist a player or team in catching more fish in the asynchronous persistent group bonus game. The bonus game play assets may be acquired from a player's play in the primary game of chance, obtained while playing the asynchronous persistent group bonus game, or bought with credit at a virtual bonus game store as described in Example 2.

Each avatar 164*a-n* may be labeled by team and/or the player name. However, this is not intended to be limiting as each player may be identified by any other means, such as the color of the avatar, use of other identifiers, such as flags, and the like. Furthermore, the bonus game environment 162 and the avatars 164*a-n* can have any design or any characteristics as needed for a player to play the asynchronous persistent group bonus game.

Figure 6A:
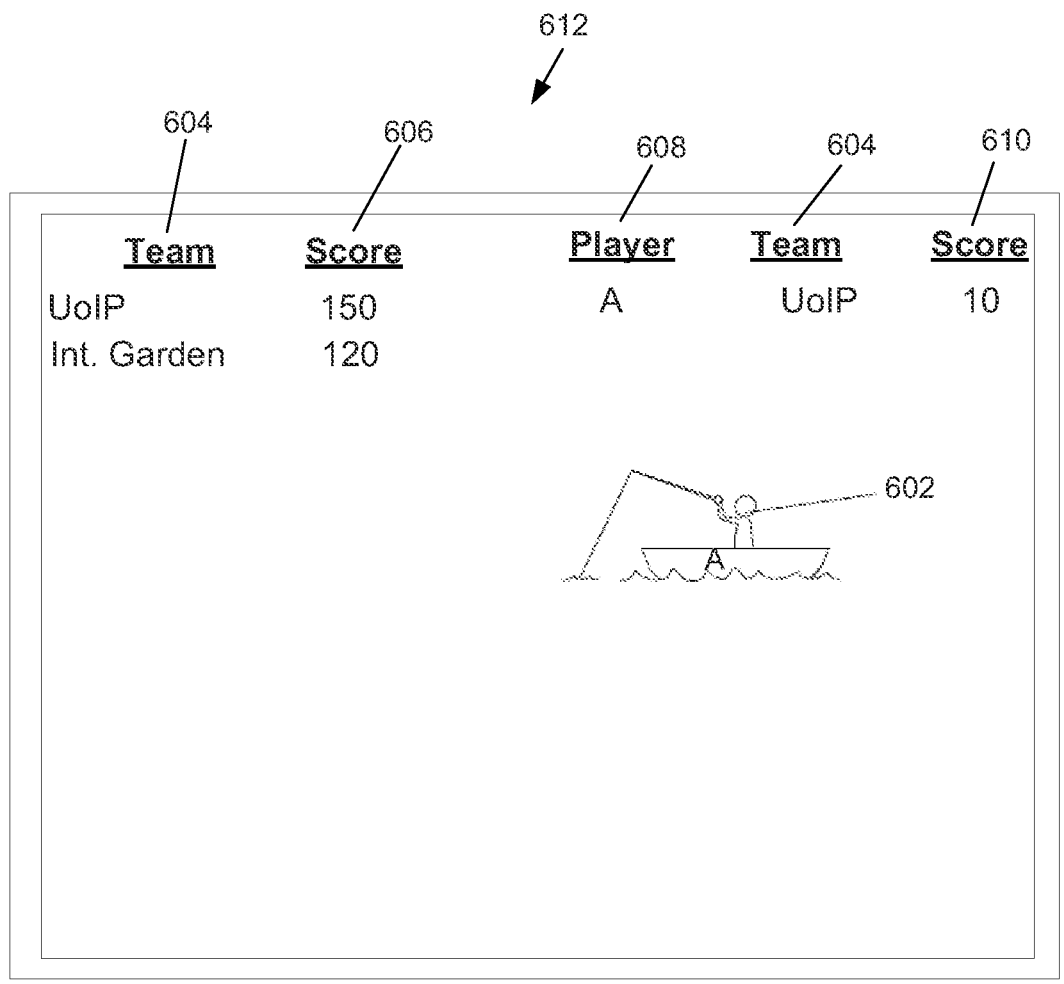
FIGS. 6A-6C illustrate display presentations of an example asynchronous persistent group bonus game.
Figure 6B:
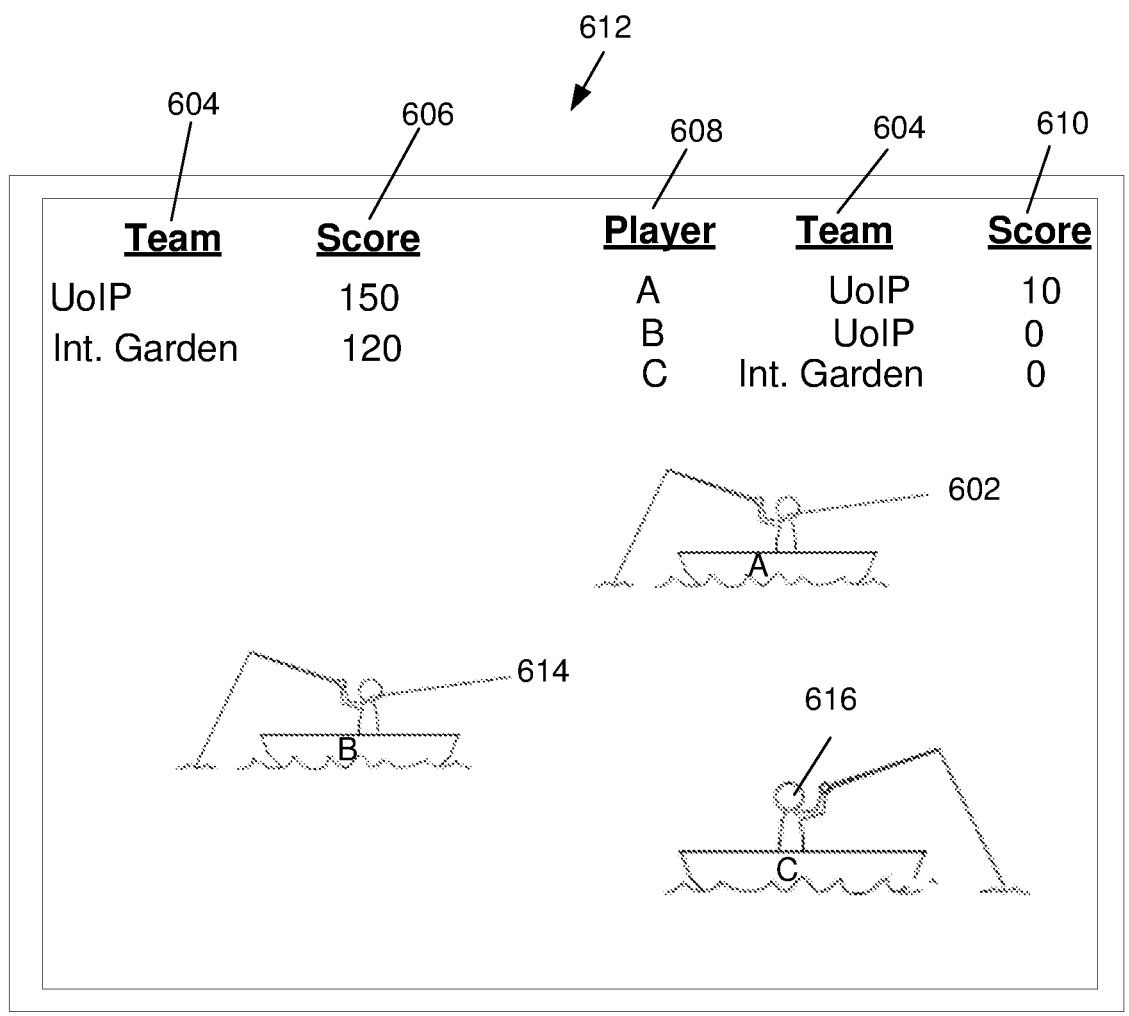
Figure 6C:
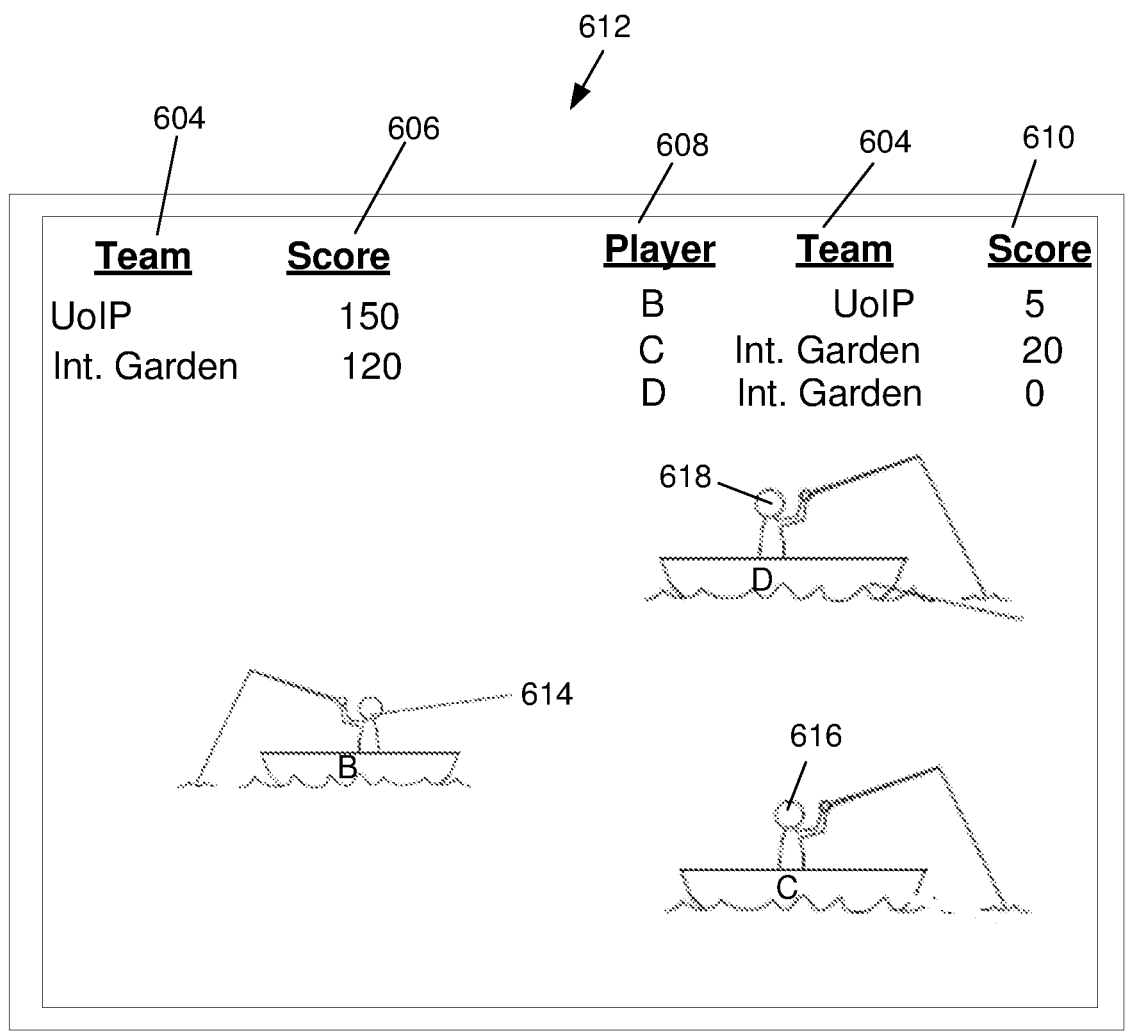

FIGS. 6A-6C illustrate display presentations of an example asynchronous persistent group bonus game. Referring to FIG. 6A, the display 612 may display or present the teams 604 that are registered to play the asynchronous persistent group bonus game along with the scores 606 for each team. The display 612 may also list or display each player 608 that is currently playing a bonus game session in the asynchronous persistent group bonus game, the team 604 the player 608 is playing on, as well as the individual score 610 for the player 608. As illustrated, Player A 602 is currently playing a bonus game session in the asynchronous persistent group bonus game and has accumulated 10 points.

Referring now to FIG. 6B, while Player A is playing a bonus game session, Player B 614 may join the asynchronous persistent group bonus game and play for team UoIP. Player C 616 may join the asynchronous persistent group bonus game and play for team Int. Garden. Since Player B 614 and Player C 616 each just started a bonus gaming session in the asynchronous persistent group bonus game, the scores 610 for each are "0".

Referring now to FIG. 6C, once a bonus session end trigger is received from Player A 602, Player A may be removed from the asynchronous persistent group bonus game environment. The bonus session end trigger may be any event as discussed above. However, Player B 614 and Player C 616 may continue to play their bonus game session within the asynchronous persistent group bonus game. Additionally, as Player B 614 and Player C 616 continue to play their bonus game session, Player D 618 may join the asynchronous persistent group bonus game to play for team Int. Garden. The asynchronous persistent group bonus game may continue until an end bonus game trigger is triggered as discussed above with reference to FIG. 5.

Example 2

For exemplary purposes only and not intended to be limiting, an example of a virtual bonus game store will be described. Although described with reference to a fishing-type bonus game, this is not intended to be limiting as any type of virtual bonus game store may be developed for the asynchronous group bonus game.

Figure 7:
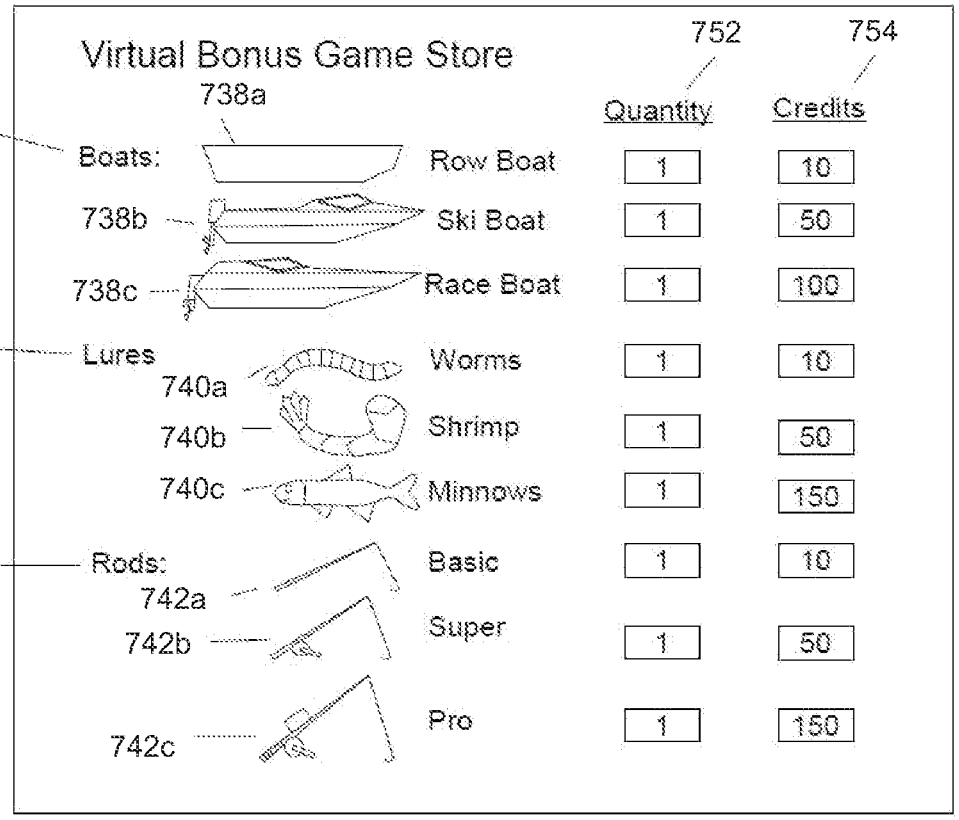
FIG. 7 illustrates an example virtual bonus game store.
Figure 9:
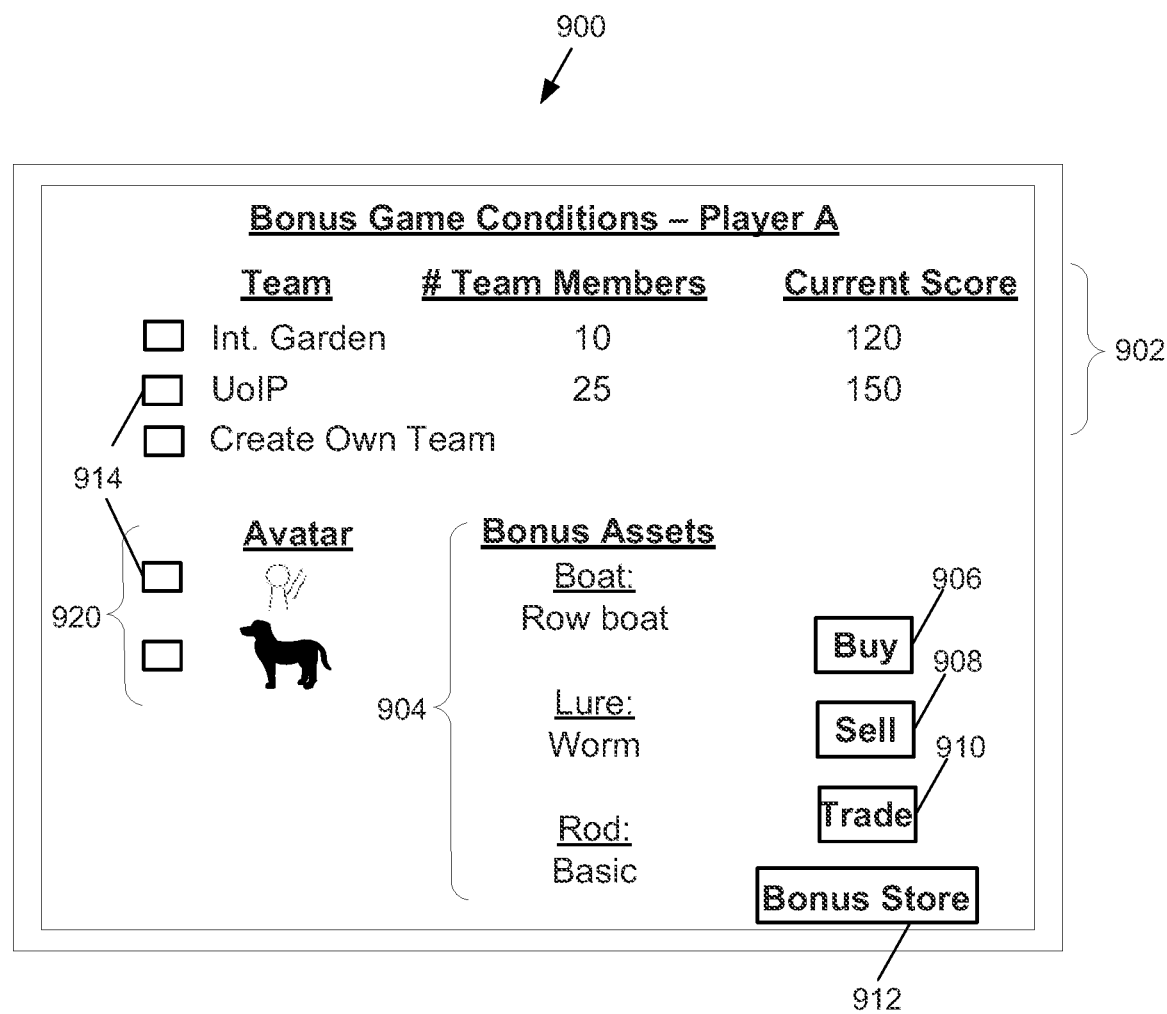
FIG. 9 illustrates an exemplary bonus game condition set.

FIG. 7 illustrates an example virtual bonus game store 750. A player may have the option to use their credits to purchase bonus assets used when playing a bonus session game. As stated above, the bonus game play assets may be bought with credit at a virtual bonus game store 750 or may be earned via playing the primary game. The store 750 may provide different types of assets that a player may use to play the bonus game. For this example, the store 750 may sell a variety of boats 728, lures 730, and fishing rods 732.

A virtual bonus game store 750 may be an online store where players can buy, sell, or trade their virtual assets. The virtual bonus game store may be uniquely designed as a part of an asynchronous persistent group bonus game or be a generic application that associates with multiple asynchronous persistent group bonus games. In one embodiment, the virtual bonus game store may be implemented as a software application with its associated database operating on a server connected to the network and accessible by participating players.

In one embodiment, the player may buy assets to use for the bonus game session. However, in another embodiment, the player may sell back the assets to obtain credits to play other games of chance, cash, or non-monetary purchases as discussed above. For example, if the player no longer wants to participate in the asynchronous persistent group bonus game, the player may sell back his boat, rod, lures, nets, and any other assets he may have accumulated. In still another embodiment, the player may trade his current assets for other assets to use in the bonus session game. For example, the player may want to trade in his current boat for an improved and faster boat.

The player may select from a row boat 738*a*, ski boat 738*b*, or a racing boat 738*c*. Each boat may allow the player the move around the pond faster to provide a better chance of catching fish. The player may also select to use a worm 740*a*, shrimp 740*b*, or a minnow 740*c* as a lure. For a fishing rod, the player may elect to use the basic fishing rod 742*a*, the super rod 742*b*, or the professional rod 742*c*. The type of lure and/or fishing rod selected may determine the type and/or weight of fish caught as well as the speed at which the player catches the fish. By using superior tools or having better or more experience than other participating players, the player may have a better probability that a winning random number is drawn. For instance, the player may be assigned a number ranging between 1-5 when a random number is drawn between 1-100 by a random number generator, compared to other less experienced players who may be assigned a number ranging between 1-3.

In one embodiment, for each asset, the player may elect to choose the quantity 752 desired. Additionally, the amount of credits 754 required to obtain each asset may be displayed.

Example 3

For exemplary purposes only and not intended to be limiting, a presentation on a display of the gaming machine will be described. Although described with reference to a fishing-type bonus game, this is not intended to be limiting as any type of game plot and presentation on any display may be developed for the asynchronous persistent group bonus game. Additionally, the presentation display is not intended to be limiting as the presentation may be presented in any known format such as on a different part of the display, other information may be presented, and/or the information may be presented in different column and row formats.

FIG. 8 illustrates an example display of a gaming machine displaying asynchronous persistent group bonus game data. The display 800 may include information about the current state of the asynchronous persistent group bonus game 802 including the teams currently participating in the asynchronous persistent group bonus game, players currently playing a bonus session game in the asynchronous persistent group bonus game, and the scores for each team and individual.

The display 800 may also present the bonus assets 804 that the player currently has. As illustrated, Player D may have a row boat, worm lures, and a basic fishing rod. Additionally, information about the player 806 may be displayed such as the team the player is playing on, his avatar, and his score.

Example 4

For exemplary purposes only and not intended to be limiting, an example bonus game condition set display 900 will be described. Although described with reference to a fishing-type bonus game, this is not intended to be limiting as any type of game plot and presentation on any display may be developed for the asynchronous persistent group bonus game. Additionally, any other conditions may be presented for the player to select.

As described above, the bonus game session condition set may be any user-selected conditions that can affect the dynamics of the bonus game session. The user-selected conditions may be a specific team 902 the player would like to join when playing the bonus game session. As illustrated, the player may choose to play on team Int. Garden, UoIP, or create his own team. The player may use any means to make a selection such as using the selection indicators 914, highlighting the selection, clicking or touching the selection, or the like. The number of team members and current score for each team may also be displayed.

The player may also be prompted to select an avatar 920 to represent him while playing the bonus session game in the asynchronous persistent group bonus game. The bonus assets 904 the player currently has may also be listed. The player may have the option to select the Buy 906, Sell 908, Trade 910 button to buy, sell, or trade any of the bonus assets. Once selected, the player may be directed to the virtual bonus game store as illustrated in Example 2. Alternatively, the player may be directed to the virtual bonus game store by clicking the Bonus Store 912 button.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An asynchronous persistent group game system comprising:
   a plurality of devices, each having a display; and
   a server having one or more processors and memory storing a plurality of avatars, a plurality of assets, and a plurality of instructions, wherein the server is operable to communicate with the plurality of devices via a network and the instructions, when executed by the one or more processors, cause the one or more processors to at least:
   transmit, over the network, a first signal indicative of an initiation of an asynchronous persistent group game for entry by one or more of the plurality of devices in response to one of the devices in the plurality of devices transmitting a triggering signal,
   transmit, over the network and to each device of the one or more devices of the plurality of devices, to activate the asynchronous persistent group game,
   transmit, over the network and to each device of the one or more devices of the plurality of devices, a signal to control the display thereof to animate the plurality of avatars and the plurality of assets for use in the asynchronous persistent group game,
   compare each device of the one or more devices of the plurality of devices to determine a first device of the one or more devices of the plurality of devices on which to animate a first asset of the plurality of assets being made acquirable for use with a first avatar selected from the plurality of avatars,
   randomly map, in response to determining the first device and via a random number generator, the first asset acquired from the plurality of assets to narrow a range of outcomes available for a generated outcome of the asynchronous persistent group game, and determine, based on the range of outcomes, the generated outcome for the first device with the first avatar and the first asset.

2. The asynchronous persistent group game system of claim 1, wherein the plurality of devices comprises at least one of a plurality of slot machines, portable gaming devices, cell phones, personal digital assistants, and wireless game players.

3. The asynchronous persistent group game system of claim 1, wherein the instructions, when executed by the one or more processors, further cause the one or more processors to acquire additional assets based on credits awarded to the first device.

4. The asynchronous persistent group game system of claim 1, wherein the instructions, when executed by the one or more processors, further cause the one or more processors to allow the first device to asynchronously enter the asynchronous persistent group game while a second device of the plurality of devices is playing the asynchronous persistent group game.

5. The asynchronous persistent group game system of claim 1, wherein the instructions, when executed by the one or more processors, further cause the one or more processors to update the asynchronous persistent group game with at least one of a new feature and an enhancement during a predetermined period.

6. The asynchronous persistent group game system of claim 1, wherein the instructions, when executed by the one or more processors, further cause the one or more processors to allow the first device to save the asynchronous persistent group game for the first device until both the first device and a second device of the plurality of devices are eligible to enter the asynchronous persistent group game.

7. The asynchronous persistent group game system of claim 1, wherein one or more of the plurality of avatars and the plurality of assets affect the generated outcome of the asynchronous persistent group game.

8. A gaming device comprising:
a display; and
a controller having one or more processors and memory storing a plurality of instructions which, when executed by the one or more processors, cause the one or more processors to at least:
transmit, over a network and to a server, a first signal indicative of activating an asynchronous persistent group game on the display,
receive, over the network and from the server, a plurality of avatars and a plurality of assets available for animation on the display,
animate the plurality of avatars and the plurality of assets received on the display,
transmit, over the network and to the server, a first avatar selected from the plurality of avatars,
cause a first asset of the plurality of assets to be animated so as to be visually made available for use with the first avatar selected,
randomly map, via a random number generator, the first asset acquired from the plurality of assets to narrow a range of outcomes available for a generated outcome of the asynchronous persistent group game, and
determine, based on the range of outcomes, the generated outcome for the first avatar and the first asset.

9. The gaming device of claim 8, wherein the instructions, when executed by the one or more processors, further cause the one or more processors to acquire additional assets based on credits accumulated.

10. The gaming device of claim 8, wherein the instructions, when executed by the one or more processors, further cause the one or more processors to asynchronously enter the asynchronous persistent group game while a different gaming device is playing the asynchronous persistent group game.

11. The gaming device of claim 8, wherein the instructions, when executed by the one or more processors, further cause the one or more processors to update the asynchronous persistent group game with at least one of a new feature and an enhancement during a predetermined period communicated from the server.

12. The gaming device of claim 8, wherein the instructions, when executed by the one or more processors, further cause the one or more processors to save the asynchronous persistent group game until a second gaming device is also eligible to enter the asynchronous persistent group game.

13. The gaming device of claim 8, wherein one or more of the plurality of avatars and the plurality of assets affect the generated outcome of the asynchronous persistent group game.

14. A method for operating an asynchronous persistent group game system having a server and a plurality of devices, each of the plurality of devices having a display, the server having one or more processors and memory storing a plurality of avatars, and a plurality of assets, and a plurality of instructions, the server operable to be in data communications with the plurality of devices via a network, the method comprising:
transmitting, over the network and to a first device of the plurality of devices, a first signal indicative of activating an asynchronous persistent group game;
animating, on the display of the first device, a first asset of the plurality of assets being visually made available for use with a first avatar selected from the plurality of avatars and with the first device in the asynchronous persistent group game based on the transmitted first signal;
randomly mapping, via a random number generator, the first asset acquired from the plurality of assets to narrow a range of outcomes available for a generated outcome of the asynchronous persistent group game; and
determining, based on the range of outcomes, the generated outcome for the first device with the first avatar and the first asset.

15. The method of claim 14, wherein the plurality of devices comprise at least one of a plurality of slot machines, portable gaming devices, cell phones, personal digital assistants, and wireless game players.

16. The method of claim 14, further comprising acquiring additional assets based on credits awarded to the first device.

17. The method of claim 14, further comprising allowing the first device to asynchronously enter the asynchronous persistent group game while a second device of the plurality of devices is playing the asynchronous persistent group game.

18. The method of claim 14, further comprising updating the asynchronous persistent group game with at least one of a new feature and an enhancement during a predetermined period.

19. The method of claim 14, further comprising allowing the first device to save the asynchronous persistent group game for the first device until both the first device and a second device of the plurality of devices are eligible to enter the asynchronous persistent group game.

20. The method of claim 14, wherein one or more of the plurality of avatars and the plurality of assets affect the generated outcome of the asynchronous persistent group game.

* * * * *